(12) United States Patent
Tonoli et al.

(10) Patent No.: US 7,819,210 B2
(45) Date of Patent: Oct. 26, 2010

(54) ELECTROMECHANICAL DRIVING AND BRAKING MODULE FOR A WHEELED VEHICLE AND A WHEELED VEHICLE EQUIPPED WITH SUCH AN ELECTROMECHANICAL MODULE

(75) Inventors: Andrea Tonoli, Avigliana (IT); Andrea Festini, Collegno (IT); Fabio Cavalli, Alessandria (IT); Stefano Carabelli, Cesana Torinese (IT)

(73) Assignee: Fondazione Torino Wireless, Turin (IT)

( * ) Notice: Subject to any disclaimer, the term of this patent is extended or adjusted under 35 U.S.C. 154(b) by 772 days.

(21) Appl. No.: 11/638,302

(22) Filed: Dec. 13, 2006

(65) Prior Publication Data
US 2007/0152499 A1    Jul. 5, 2007

(30) Foreign Application Priority Data
Dec. 14, 2005    (EP)    .................................. 05027402

(51) Int. Cl.
*B60W 20/00*    (2006.01)
(52) U.S. Cl. .............................. 180/65.21; 180/65.265; 180/65.31
(58) Field of Classification Search ................. 180/165, 180/65.1, 65.22, 65.31, 65.51, 65.8, 305, 180/306, 308; 310/112
See application file for complete search history.

(56) References Cited

U.S. PATENT DOCUMENTS

| | | | | |
|---|---|---|---|---|
| 5,258,912 A * | 11/1993 | Ghoneim et al. | ............... | 701/42 |
| 5,291,106 A * | 3/1994 | Murty et al. | ................. | 318/375 |
| 5,511,866 A * | 4/1996 | Terada et al. | ................ | 303/152 |
| 5,590,737 A * | 1/1997 | Azuma et al. | ............... | 180/308 |
| 6,170,587 B1 * | 1/2001 | Bullock | ...................... | 180/69.6 |
| 6,275,004 B1 * | 8/2001 | Tamai et al. | ................. | 320/118 |
| 6,283,239 B1 * | 9/2001 | Tsukamoto et al. | ...... | 180/65.25 |
| 6,286,635 B1 * | 9/2001 | Tamor | ....................... | 188/72.3 |
| 6,454,033 B1 * | 9/2002 | Nathan et al. | .............. | 180/65.1 |
| 6,623,087 B1 | 9/2003 | Wolff | ........................ | 303/10 |
| 6,666,308 B1 | 12/2003 | De Vries et al. | ............ | 188/157 |
| 7,058,459 B2 * | 6/2006 | Weiberle et al. | .............. | 700/19 |
| 7,281,770 B1 * | 10/2007 | Curran et al. | ............... | 303/151 |
| 7,315,774 B2 * | 1/2008 | Morris | ......................... | 701/53 |
| 2001/0033106 A1 * | 10/2001 | Shirai et al. | .................. | 303/177 |
| 2003/0184147 A1 * | 10/2003 | Perach | ......................... | 303/20 |
| 2004/0222639 A1 * | 11/2004 | Turner et al. | .................... | 290/3 |
| 2005/0056475 A1 | 3/2005 | Roberts | ...................... | 180/165 |
| 2005/0140230 A1 | 6/2005 | Johnson et al. | ............. | 310/112 |
| 2006/0232128 A1 * | 10/2006 | Weiberle et al. | ............ | 303/187 |
| 2007/0138887 A1 * | 6/2007 | Tonoli et al. | ................. | 310/112 |
| 2007/0273198 A1 * | 11/2007 | Tonoli et al. | .................... | 303/3 |

FOREIGN PATENT DOCUMENTS

| | | |
|---|---|---|
| DE | 44 46 219 | 6/1996 |
| WO | WO 00/32462 | 6/2000 |
| WO | WO 01/76902 | 10/2001 |
| WO | WO 2005/005854 | 1/2005 |

\* cited by examiner

*Primary Examiner*—Lesley Morris
*Assistant Examiner*—Jacob Meyer
(74) *Attorney, Agent, or Firm*—Fattibene and Fattibene; Paul A. Fattibene

(57) ABSTRACT

An electromechanical module is provided allowing performance of both the driving and the braking function on a single wheel. The electromechanical module according to the present invention comprises in particular electromechanical driving means and electromechanical braking means controlled by a single control unit, so that electrical power may be supplied to each of said electromechanical driving and braking means. Moreover, according to a particular embodiment of the present invention, electrical power may be collected from said driving means and supplied to said braking means.

38 Claims, 10 Drawing Sheets

ELECTROMECHANICAL DRIVING AND BRAKING MODULE FOR A WHEELED VEHICLE AND A WHEELED VEHICLE EQUIPPED WITH SUCH AN ELECTROMECHANICAL MODULE

FIELD OF THE INVENTION

The present invention relates to the field of automotive applications. In particular, the present invention relates to an electromechanical module for wheeled vehicles and a wheeled vehicle equipped with such a module. In more detail, the present invention relates to an electromechanical driving and braking module, i.e. an electromechanical module adapted to act on a wheel of a vehicle so as to perform both the driving and braking function on this wheel. Still in more detail, the present invention relates to an electromechanical module comprising both electromechanical driving means adapted to perform said driving function and electromechanical braking means adapted to perform said braking function on correspondingly friction means of said wheel. In particular, the present invention relates to an electromechanical module wherein both said electromechanical driving means and said electromechanical braking means comprise an electric motor, and wherein said electromechanical module further comprises means common to both said electromechanical driving and braking means and adapted to control the supply of electrical power to both said two motors. Furthermore, the present invention relates to an electromechanical module, wherein said means for controlling the supply of electrical power to both said two motors comprise means for collecting electrical power from the driving motor and to transfer, at least partially, the power collected from said driving motor to the braking motor.

DESCRIPTION OF THE PRIOR ART

Over the last years, many efforts have been devoted in the automotive field to the development of new systems adapted to replace the conventional hydraulic and/or mechanic systems in many applications such as, for instance, the steering, brake, shift and differential systems. In particular, many efforts have been dedicated to the development of so-called "by-wire" systems, i.e. of systems integrating electric and/or electronic equipments in combination with mechanical or hydraulic components. The advantages offered by the newly developed by-wire systems with respect to the traditional mechanical systems, in particular the advantages offered in terms of high reliability, low weight and costs allowed their implementation in several automotive applications. Moreover, with respect to the traditional hydraulic or mechanical solutions, the by-wire technology offers additional advantages such as, for example, an improved vehicle dynamic, improved comfort and vehicle architecture. It has, in fact, to be noted that the by-wire systems offer improved performances in terms of a better control of the longitudinal and the lateral forces, thus leading to a better vehicle dynamic behavior with the related improvement in terms of the passive and active safety. Moreover, concerning the comfort of the vehicle, the absence of mechanical links to the brake, steering, gear, shift, clutch, differential and the like, allows the improvement of the interface with the driver and his driving feeling. Furthermore, concerning the vehicle architecture, it came out that the absence of the mechanical links to the driver's commands opens good possibilities towards new vehicle architectures with the related fallout of ergonomics and safety issues. An example of a by-wire electro-hydraulic brake actuator can be found in document U.S. Pat. No. 6,623,087; in particular, the by-wire brake system known from this document comprises a hydraulic actuator or pump which is driven at variable speeds by an electric motor, along with two electro-valves devoted to the control of the pressure of the hydraulic fluid. Moreover, an electronic control unit controls the functions of both the electric motor and the electro-valves. This solution may, therefore, be regarded as a hybrid electrically driven by-wire solution comprising an electronic control unit to manage the interaction between the driver, the actuators and the caliper.

The by-wire electro-hydraulic actuator disclosed in document U.S. Pat. No. 6,623,087 offers several advantages and allows overcoming, at least in part, the drawbacks affecting the conventional hydraulic systems. In fact, the electronic control exploited by the electronic control unit allows the system to be easily integrated and to be easily adapted to a common brake system. Moreover, due to the electric actuation, no efforts are required by the driver and a very high actuation speed is offered. Furthermore, due to its hydraulic components, this system offers a very high reduction ratio since a relatively big displacement of the hydraulic actuator is transformed in an extremely small displacement of the braking pads. Additionally, a very important feature of this by-wire brake actuating device relates to the backlash recovery, namely to the possibility of automatically recovering the backlash of the braking pads due to their wear over time. In other words, the wear of the braking pads and the resulting backlash are automatically recovered and compensated, thanks to the use of the hydraulic fluid and pump.

However, in spite of all the advantages offered, the electro-hydraulic by-wire brake actuators of the kind known from document U.S. Pat. No. 6,623,087 are not free from disadvantages and/or drawbacks. In fact, the presence of hydraulic components (pump, pipes and fluid) also brings along some old problems affecting the conventional hydraulic actuators; in particular, the danger of leakage is still present, since the hydroscopic behavior of some hydraulic fluids currently used leads to fading. These problems are only partially avoidable using sealed circuits. Moreover, the substitution of the hydraulic fluid and/or its disposal at the end of the vehicle's lifetime is quite troublesome and expensive since the hydraulic fluid may not simply be disposed of and/or discharged into the environment, but has to be collected and destroyed according to very strict anti-pollution procedures. Finally, the need for connection pipes and/or hoses from the pressure generator (pump) to the actuator and/or caliper may mostly not be avoided, i.e. at least one big or, alternatively, mainly small hydraulic circuits are needed, thus rendering the known by-wire electro-hydraulic actuators very bulky and heavy and, therefore, not in compliance with the actual exigencies of the car manufacturers.

For the purpose of at least partially overcoming the drawbacks effecting the electro-hydraulic by-wire brake actuating devices, electromechanical by-wire solutions have also been proposed in the past; in particular, these solutions were developed for the purpose of eliminating the hydraulic fluid from the actuators, thus improving the environmental characteristic of the systems. However, developing electromechanical by-wire actuating devices revealed itself to be a quite difficult task, essentially due to the fact that very important technical issues had to be addressed. Accordingly, even if, on the one hand, it may be appreciated that some important results were obtained, it has to be noted on the other hand, that the proposed solutions are affected by several drawbacks which render these solutions less attractive for applications in the automotive field. In particular, these drawbacks relate essentially to the relative big weight, the high construction complexity, the large power required from the electrical system of the vehicle and the corresponding high costs of these solutions.

In addition to the drawbacks disclosed above affecting both the electro-hydraulic and electro-mechanical by-wire solutions proposed in the past, it has also to be noted that the by-wire solutions currently adopted are usually based on actuation units, each performing a single function such as, for example, steering, braking, driving or the like; in particular, in the known solutions, independent electric and/or electronic equipments are provided for the purpose of controlling the functions of each single actuation unit.

If it may be appreciated that these solutions offer some advantages in terms of the reduced complexity of each single by-wire system, it has to be noted that, on the other hand, some drawbacks arise, essentially relating to a reduced possibility of performing several functions simultaneously and/or of controlling the functions of each single actuating unit through a centralized system, so that the overall control of each single function is not in compliance with the actual exigencies of the car manufacturers; moreover, the known solutions are affected by the further drawback relating to their too high weight and costs.

SUMMARY OF THE INVENTION

Accordingly, in view of the problems and/or drawbacks identified above, it is an object of the present invention to provide a new by-wire solution overcoming these drawbacks and/or problems. In particular, it is an object of the present invention to provide a new electromechanical module comprising several electromechanical actuating means adapted to perform corresponding different functions simultaneously, with the functions of these several electromechanical actuating means being controlled and/or managed by unique electric and/or electronic equipment. In more detail, it is an object of the present invention to provide a new by-wire electromechanical module adapted to act on a wheel of a vehicle, so as to perform both the driving and braking functions on this wheel. Moreover, it is a further object of the present invention to provide a new by-wire driving and braking electromechanical module comprising both electromechanical driving and braking means and a synchronized electric or electronic equipment allowing to adequately control the supply of electrical power to both said electromechanical driving and braking means. A further object of the present invention is that of providing an electromechanical by-wire module comprising both electromechanical driving and braking means, wherein the electromechanical power generated by the driving means may be, at least partially, adequately transferred to the braking means under the control of said centralized electric and/or electronic equipment. Still a further object of the present invention is that of providing an electromechanical by-wire module comprising both electromechanical driving and braking means, wherein said braking means offer a big reduction ratio and overcome the problems affecting the prior art electromechanical braking devices, such as, for example, the big weight, high construction complexity, low back drive efficiency or the like. Moreover, another object of the present invention is that of providing an electromechanical by-wire module comprising both electromechanical driving and braking means, wherein said braking means allow the recovery of the backlash arising due to the brake pads wear and wherein the two phases of the brake actuation and the wear recovery may be kept separated.

To this end, according to the present invention, there is provided an electromechanical module adapted to act on a wheel of a vehicle and performing, for said single wheel, the drive and brake functions by means of corresponding electromechanical actuators. Moreover, in addition to the electromechanical actuators, the solution proposed according to the present invention includes electronic control units to drive the actuators so as to realize a complete control on said single wheel. This solution may be identified as a corner by-wire solution and is conceived to manage the brake and the drive torque localized on the single corner or the single wheel of the vehicle.

In particular, according to the present invention, there is provided an electromechanical module as in one embodiment, namely an electromechanical module adapted to act on a wheel of a vehicle so as to perform both the driving function and the braking function on said wheel, wherein said module comprises first electromechanical driving means adapted to perform said driving function on said wheel and second electromechanical braking means adapted to perform said braking function on friction means of said wheel, along with means for controlling the supply of electrical power to each of said first driving means and second braking means.

Moreover, according to the present invention, there is provided an electromechanical module as in another embodiment, namely an electromechanical module wherein said means for controlling the supply of electrical power to each of said first driving means and second braking means comprise a first power electric unit electrically connected to said first electromechanical driving means, a second power electric unit electrically connected to said second electromechanical braking means and a control unit electrically connected to each of said first and second power electronic units.

Still according to the present invention, there is provided an electromechanical module as in yet another embodiment, namely an electromechanical module wherein said first power electronic unit is adapted to be electrically connected to a first battery pack so as to control the supply of electrical power from said first battery pack to said first driving means, and wherein said second power electronic unit is adapted to be electrically connected to a second battery pack so as to control the supply of electrical power from said second battery pack to said second braking means.

According to the present invention, there is also provided an electromechanical module as in a further embodiment, namely an electromechanical module wherein said first driving means comprise a first electric driving motor electrically connected to said first power electronic unit, and adapted to provide the driving torque for performing said driving function, and first mechanical actuating means adapted to be mechanically coupled to said wheel.

Still according to the present invention, there is also provided an electromechanical module as in another embodiment, namely an electromechanical module wherein said second braking means comprise a second electric motor electrically connected to said second power electronic unit, and second actuating means adapted to be activated by said second electric motor so as to perform said braking function on said friction means of said wheel.

Furthermore, according to the present invention, there is also provided an electromechanical module as in another embodiment, namely an electromechanical module wherein said second actuating means comprise rotatable means adapted to be rotated by said electric motor and a displaceable actuating member adapted to actuate at least one brake lining, thus pressing it against said at friction means, and wherein said rotatable means comprise a rotatable element with a surface abutting against said actuating member so that rotation of said element in a first rotation sense results in said actuating member being displaced along a first actuating direction, thus actuating said at least one brake lining and pressing it against said at least one friction element.

Still according to the present invention, there is also provided an electromechanical module as in another embodiment, namely an electromechanical module with fixing means comprising displaceable means adapted to be displaced along a second predefined direction, the displacement of said displaceable means along said second predefined direction resulting in said motor being displaced together with said rotatable means along a third predefined direction substantially perpendicular to said second predefined direction and substantially parallel to said first actuating direction.

There is also provided a wheeled vehicle exploiting the electromechanical module according to the present invention, namely a wheeled vehicle as in another embodiment comprising at least two wheels and equipped with at least one electromechanical module as in the prior embodiments, with said at least one module acting on a corresponding one of said two wheels.

As will become more apparent with the following disclosure, the principle on which the present invention is based relates to the fact that a single electromechanical module may be provided performing on a single wheel of a vehicle both the driving and braking functions by means of electromechanical actuators. In particular, the present inventions is based on the principle that this can be obtained by providing independent electromechanical driving and braking means working under the control of a single electric and/or electronic equipment. Moreover, the present invention is based on the principle that the two driving and braking functions may be adequately integrated by providing driving means adapted to generate electrical powers and by providing electric and/or electronic means adapted to adequately collect the electrical power generated by the driving means, and to transfer the collected electrical power to the braking means. Moreover, the present invention is based on the principle that providing two independent electric motors for the purpose of furnishing the necessary driving and braking torques allows realizing braking means offering a big reduction ratio and improved braking performances. Moreover, using an electric motor for the braking means, in combination with a rotatable cam element adapted to be rotated by said electric motors, allows to adequately recovery the backlash arising due to the wear of the braking pads over time.

BRIEF DESCRIPTION OF THE DRAWINGS

In the following, a description will be given with reference to the drawings of particular and/or preferred embodiments of the present invention; it has, however, to be noted that the present invention is not limited to the embodiments disclosed but that the embodiments disclosed only relate to particular examples of the present invention, the scope of which is defined by the appended claims. In particular, in the drawings:

DETAILED DESCRIPTION OF THE PREFERRED EMBODIMENTS

Figure 1A:
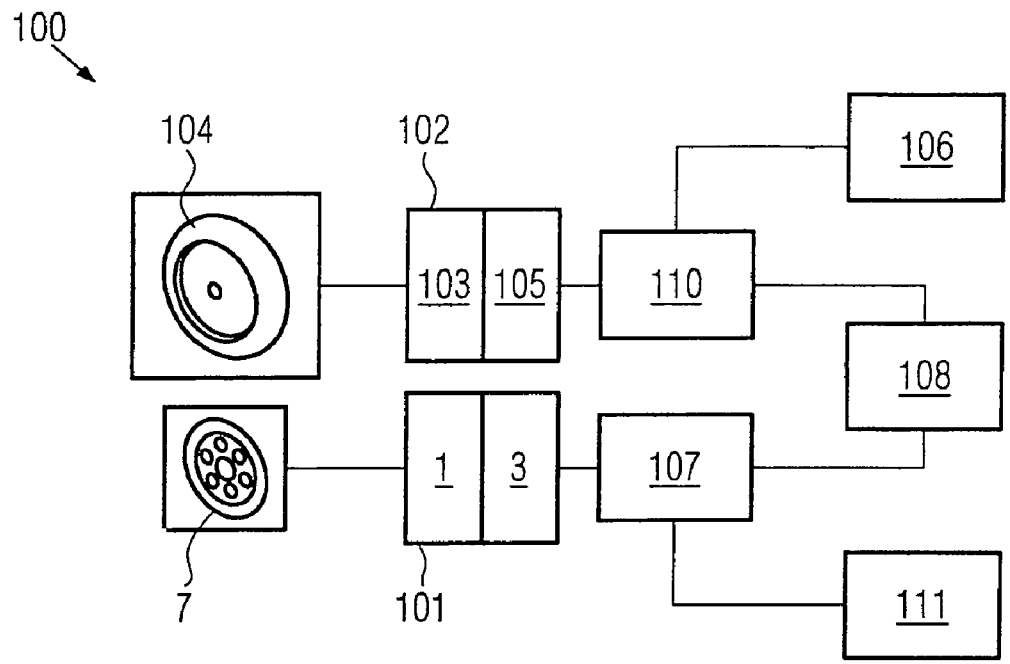
FIG. 1a relates to a schematic view of a first embodiment of the electromechanical by-wire module according to the present invention.

While the present invention is described with reference to the embodiments as illustrated in the following detailed description as well as in the drawings, it should be understood that the following detailed description as well as the drawings are not intended to limit the present invention to the particular illustrative embodiments disclosed, but rather the described illustrative embodiments merely exemplify the various aspects of the present invention, the scope of which is defined by the appended claims.

As apparent form the disclosure given above, the present invention is understood to be particularly advantageous when used for applications in the automotive field; in particular, the present invention is understood to be particularly advantageous when applied to a single wheel of a vehicle. In fact, as stated above, by exploiting the present invention in a vehicle, for instance implementing two electromechanical by-wire modules according to the present invention on two corresponding wheels of a vehicle, for instance the rear wheels or the front wheels, a full dynamic control of the vehicle may be obtained. For this reason, examples will be given in the following in which corresponding embodiments of the electromechanical by-wire module according to the present invention are described in combination with a wheel of a vehicle and its friction means, for instance, its braking disk. Moreover, and for the same reason, examples will be given in the following in which corresponding embodiments of the electromechanical by-wire module according to the present invention are described, with said embodiments performing both the driving and braking functions on said wheel. However, it has to be noted that the present invention is not limited to the particular case of an electromechanical module adapted to act on a wheel of a vehicle; in particular, it has to be noted that the present invention is not limited to the particular case of an electromechanical module performing both the braking an driving functions on said wheel. On the contrary, the principle on which the electromechanical module according to the present invention is based may also be applied to electromechanical modules adapted to act on systems and/or devices other than the wheel of a vehicle and to perform functions other than the driving and braking functions on said wheel. It will, therefore, become apparent from the following disclosure that the present invention may also be used for other applications, in particular for other automotive applications, for example, in combination with steering, clutch, gear, shift, differential and similar systems. Moreover, it will become apparent from the following disclosure that the present invention may also be used and applied in all those cases wherein two independent electromechanical actuators performing corresponding different functions have to be controlled and managed simultaneously and/or in combination; moreover, it will also become apparent from the following disclosure that the present invention may also be applied in all those cases in which electrical power has to be adequately supplied to each of said separated electromechanical actuators as well as in all those cases in which the need arises for transferring electrical power between two independent electromechanical actuators.

In the following, with reference to FIG. 1, a first embodiment of the electromechanical by-wire module according to the present invention (in the following also referred to as electromechanical module and/or corner, or by-wire module or corner, or simply as module or corner) will be described; in particular, in FIG. 1, said electromechanical module is generally identified by the reference numeral 100. Moreover, in FIG. 1a, reference numerals 110 and 107 identify a first and a second power electronic unit, respectively, whilst reference numeral 108 identifies a third electronic control unit electrically connected to each of said first and second power electronic units 110 and 107. Still in FIG. 1a, reference numerals 102 and 101 identify first and second electromechanical actuating means, respectively; in particular, said first electromechanical actuating means comprise a first electric motors 105 and corresponding mechanical actuating means 103. As apparent from FIG. 1a, said first electromechanical actuating means are coupled to a wheel 104. It appears, therefore, clearly that said first electromechanical actuating means 102, i.e. the combination of the electric motor 105 and the mechanical means 103 are provided for the purpose of performing the driving function on said wheel 104. Still in FIG. 1a, reference numeral 101 identifies second electromechanical actuating means comprising a second electric motor 3 and second mechanical actuating means 1; as apparent from FIG. 1a, said second electromechanical actuating means 101 are depicted as being connected with friction means 7 of said wheel 104, such as, for example, a braking disk of said wheel 104. It appears, therefore, clearly that said second electromechanical actuating means 101 are provided for the purpose of performing the braking function on the same wheel 104 on which the first electromechanical means 102 perform the driving function. Finally, in FIG. 1a, reference numerals 106 and 111 identify two battery packs, respectively, with the battery pack 106 being electrically connected to the first power electronic unit 110, whilst the second battery pack 111 is electrically connected to the second power electronic unit 107. It has, however, to be noted before proceeding with the disclosure of the embodiment depicted in FIG. 1a, that not all the component parts depicted therein necessarily belong to the electromechanical module generally identified by the reference numeral 100; for instance, the two battery packs, even if depicted in FIG. 1a do not necessarily belong to the electromechanical module 100; in the same way, the wheel 104, including its braking disk 7, does not necessarily belong to the electromechanical module 100. The purpose of FIG. 1a is, therefore, that of showing the way the electromechanical module according to the present invention may be implemented on a wheel in combination with two battery packs.

In the embodiment depicted in FIG. 1a, the first battery pack 106 supplies electrical power to the first electromechanical driving means 102 (in particular, to the first electric motor 105) through the first power electronic unit 110. In the same way, the second battery pack 111 supplies the second electromechanical braking means 101 (in particular, the second electric motor 3) through the second power electronic unit 107. Supplying electrical power to the first electric motor 105 results in a driving torque being exerted by said first electric motor 105, thus resulting in the driving function being performed by said first motor 105 on the wheel 104 through the mechanical actuating means 103. In the same way, when electrical power is supplied from the second battery pack 111 to the second braking means 101 (in particular to the second electric motor 3) through the second power electronic unit 107, a torque is exerted by said second electric motor 3, resulting in a braking function being performed on the braking disk 7 of the wheel 104 by said second electric motor 3 through the second mechanical braking means 1. The supply of electrical power from the two battery packs 106 and 111 to the first driving means 102 and the second braking means 101, respectively, is governed and controlled by the two power electronic unit 110 and 107, in combination with the third electronic control unit 108. Accordingly, two independent chains may be identified in the embodiment depicted in FIG. 1a, with the first upper chain (comprising the third electronic control unit 108, the first power electronic unit 110, the first driving means 102 and the first battery pack 106) performing the electric traction on the wheel 104, whilst the second, lower chain (comprising the third electronic control unit 108, the second power electronic unit 107, the second braking means 101 and the second battery pack 111) performs the braking action on the braking disk 7 of the wheel 104. The upper and lower chains are driven by the same electronic control unit 108, in combination with the first and second power electronic units 110 and 107, respectively, so that a full control of the wheel 104 is obtained. The electromechanical module depicted in FIG. 1a is particularly adapted to be exploited in combination with sensing means (for example a sensing unit not depicted in FIG. 1a) adapted to collect data relating to the driving conditions and/or the behavior of the wheel 104; in this case, the data collected by the sensing unit are adequately elaborated and corresponding signals are supplied by said sensing unit to the third electronic control unit 108, as a function of the data collected. In the same way, corresponding signals are supplied by the electronic control unit 108 to one or both of the first and second power electronic units 110 and 107, so as to adequately control the supply of electrical power from the two battery packs 106 and 111 to the first driving means 102 and the second braking means 101. Alternatively and, according to the circumstances, the third electronic control unit 108 may also be conceived as a sensing unit adapted to perform the function of collecting and elaborating the data relating to the driving conditions and/or the behavior of the wheel. Moreover, in those cases in which the vehicle implementing the electromechanical module of FIG. 1a is already provided with a main sensing unit, the function of collecting said data may be deputed to said main sensing unit, thus resulting in lower complexity of the third electronic control unit 108.

It results, therefore, from the above that the electromechanical module depicted in FIG. 1a allows control of the driving and braking functions on the same wheel of a vehicle; in particular, this is due to the fact that the driving means and a braking means may be separately supplied with electrical power. Moreover, the driving means 102, in particular the first electric driving motor 105, may be used for the purpose of generating electrical power that may be supplied to the first battery pack 106, so as to recharge first battery pack 106, thus improving the autonomy of said battery pack.

The different work modalities of the electromechanical module according to the present invention as depicted in FIG. 1*a* may be summarized as follows.

During normal cruising, for instance on straight roads, the first battery pack 106 (also referred to as the traction battery pack) supplies the first power electronic unit 110 and the electric motor 105 to provide torque to the wheel 104 through the mechanical actuating means 103. The electric motor 105 can provide high acceleration thanks to the high stall torque. Moreover, the capacity (Ah) of the battery pack 106 defines the autonomy of the vehicle in the case of electric traction only. Moreover, like braking (also referred to as coasting) can be obtained from the traction electric motor 105 working as a generator; in this case, the power electronic unit 110 synthesizes a variable resistance at the motor terminals to generate the required braking force. In this modality, the electric motor 105 works as a generator and the braking energy can be at least partially used to recharge the first battery pack 106 (regenerative braking). In case of an emergency braking, the electromechanical braking means 101 must be used instead of or in addition to the braking force arising when the first electric motor 105 is used as a generator, i.e. when electrical power is collected from said first electric motor 105; this is in particular due to the fact that during strong braking, the required torque is so large that the regenerative braking is insufficient. Accordingly, electrical power is supplied from the second battery pack 111 to the second electromechanical driving means 101 (in particular to the second electric motor 3) through the second power electronic unit 107 to activate the mechanical braking means 1 of the electromechanical braking means 101. In particular, the braking force can be modulated by controlling the torque of the electric motor 3; moreover, an electromechanical ABS system can be implemented by reading the speed of the wheel 104 and regulating the braking force with the current control on the electric motor 3.

In case of failure on the lower brake chain (of the motor 3, the power electronic unit 107 or the battery pack 111), the braking torque of the driving motor 105 can be used to stop the vehicle. In particular, the power electronic unit 110 on the upper driving and/or traction chain can be driven to short circuit the terminals of the motor 105. Of course, in this case, the performance of the brake system is reduced but the vehicle can be safely stopped in case of a failure on the brake chain and/or on the brake system.

It results, therefore, from the above that, with the electromechanical module depicted in FIG. 1*a*, some important results may be obtained by driving the driving or traction motor 105 and the braking motor 3 together. For instance, the slipping of the wheel can be controlled by adequately regulating the torque on the traction motor 105 and the braking force exerted by the electromechanical braking means 101. Moreover, implementing two electromechanical modules as depicted in FIG. 1*a* on corresponding two wheels mounted on the same axle of a vehicle, an electronic differential can be implemented and a traction control can be realized on each wheel. Moreover, in the case of a vehicle exploiting four electromechanical modules as depicted in FIG. 1*a* on the corresponding four wheels of the vehicle, a full vehicle dynamic control on the vehicle may be obtained by adequately controlling the traction torque and the braking action on each of said four wheels. In particular, in case of high slip of a wheel, the electronic control unit 108 (in combination with the first and second power electronic units 110 and 107) can manage the supply of electrical power to the first driving means 102 and the second braking means 101 so as to adequately command the traction motor 105 and the braking motor 103, thus recovering the correct operation of the wheel. Moreover, extending this control to the wheels of the same axle, a stability control of the vehicle may be obtained; in the case of vehicles equipped with a main sensing unit, said sensing unit knows the state of all the corners of the vehicle, in particular, the speed, the brake status, the brake wear and the electric traction status of each wheel. This information or data may, therefore, be sent to the control unit 108 of each electromechanical module (of each corner) so that, in the case of corners by wire on four wheels, the central, main sensing unit has the total control of the vehicle and on its dynamic behavior. For instance, when the vehicle approaches a curve with high speed, the corner by-wire systems may be used to adequately control the speed of the external and the internal wheels, thus preventing the loss of control of the vehicle.

As stated above, in the embodiment disclosed above with reference to FIG. 1*a*, electrical power may be supplied to the driving motor 105 and the braking motor 3, as soon as the need arises, from the two battery packs 106 and 111, respectively. Moreover, in the embodiment depicted in FIG. 1*a*, it is also possible to use the driving motor 105 as a generator so that electrical power may be collected from the electric driving motor 105 and used to recharge the battery pack 106. However, circumstances may arise in which it may be convenient to directly transfer the electrical power collected from the electric motor 105 to the lower braking chain, in particular to the electric braking motor 3. An example of an embodiment adapted to directly transfer electrical power from the upper driving chain to the lower braking chain will be discussed in the following with reference to FIG. 1*b*, wherein component parts already described above with reference to FIG. 1*a* are identified by the same reference numerals.

Figure 1B:
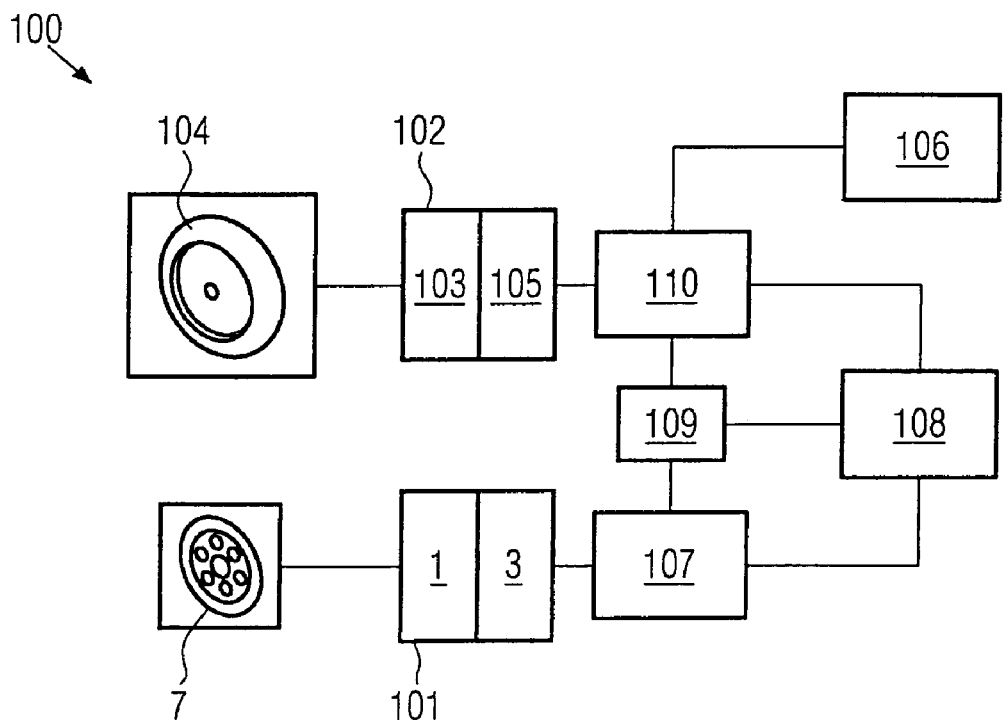
FIG. 1b relates to a schematic view of a further embodiment of the electromechanical by-wire module according to the present invention.

The electromechanical module depicted in FIG. 1*b* is essentially similar to that disclosed above with reference to FIG. 1*a* but differs from the module of FIG. 1*a* in that in the module of FIG. 1*b*, the first and second power electronic units 110 and 107 are directly connected through a third power electronic unit 109, essentially adapted to allow electrical power to be directly transferred between the upper driving chain and the lower braking chain, in particular between the first power electronic unit 110 and the second electronic unit 107. Moreover, the third power electronic unit 109 is electrically connected to the control unit 108 so that, as depicted in FIG. 1*b*, the functions of the three power electronic units 110, 109 and 107 are controlled by said control unit 108. A first aspect distinguishing the electrical module of FIG. 1*b* from that of FIG. 1*a* relates to the fact that, in the electromechanical module of FIG. 1*b*, a unique battery pack 106 is needed for the purpose of supplying electrical power to the upper driving chain, whilst the battery pack 111 provided in the electromechanical module of FIG. 1*a* is omitted.

Under normal conditions, for instance during normal cruising on straight roads, the module of FIG. 1*b* works in a way similar to that of the module of FIG. 1*a*; in particular, electrical power is supplied from the battery pack 106 to the fist driving module 105 through the first power electronic unit 110 so as to provide torque to the wheel 104. Moreover, and still similarly to the case of the module of FIG. 1*a*, light braking or coasting can be obtained, in the module of FIG. 1*b*, from the electric driving motor 105 working as a generator; in particular, in this case, electrical power is collected from the driving electric motor 105, resulting in the electric motor 105 exerting a braking action on the wheel 104 through the mechanical actuating means 103. However, when emergency braking is required, the braking energy obtained from the coasting braking when the driving motor 105 is used as a generator may be insufficient to stop the vehicle; in this case, with the embodiment of FIG. 1b, an additional braking action may be exerted on the friction means 7 supplying the braking electrical power collected from the electric motor 105 to the braking motor 3 through the three power electronic units 110, 109 and 107 under the control of the control unit 108. Accordingly, the battery pack 111 of the embodiment of FIG. 1a is no longer required but can be bypassed. As it will be explained in more detail below with reference to FIG. 6, the power electronic unit 109 may comprise capacitor banks and a plurality of switching devices.

The solution depicted in FIG. 1b allows increasing the integration of the first driving motor 105 and the second braking motor 3 in the by-wire module. Moreover, during braking, no energy is absorbed from the unique battery pack 106 (nor from the battery pack 111 in the case that the second battery pack is provided); accordingly, considering the large amount of energy required to brake a wheel, the advantages offered by the embodiment depicted in FIG. 1b evidently appear. Moreover, in the case of failure of the power electronic unit 109, i.e. in the case in which transferring the electrical power collected from the motor 105 to the braking motor 103 is no longer possible, said braking motor 103 may be supplied with electrical power by the traction battery pack 106, thus improving the safety of the system.

Two examples of two corresponding possible ways in which the electromechanical module according to the present invention may be implemented on a wheel of a vehicle will be disclosed in the following with reference to FIGS. 5a and 5b, respectively, wherein, as usual, component parts already described with reference to previous figures are identified by the same reference numerals.

Figure 5A:
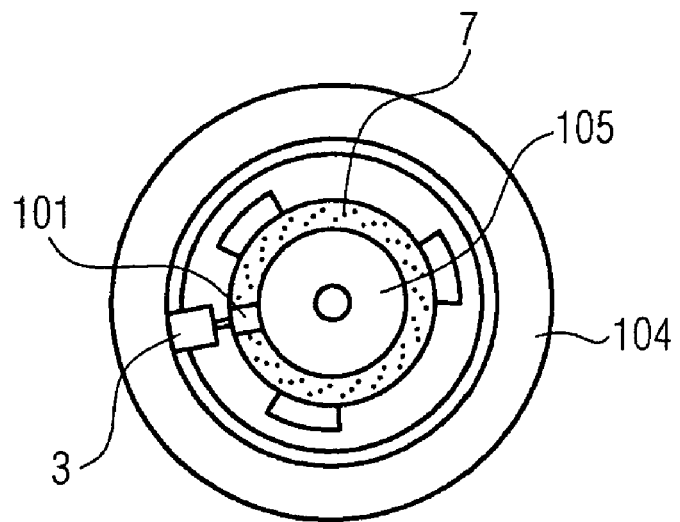
FIGS. 5a and 5b relate to schematic views of corresponding examples of the way the electromechanical by-wire module according to the present invention may be applied to a wheel of a vehicle.

In the example depicted in FIG. 5a, the driving actuator comprising the driving electric motor 105 is received in the hub of the wheel 104 whilst the electromechanical braking actuator comprising the electric braking motor 3 and the mechanical actuating mean 1 is placed in proximity of the wheel 104, so as to allow said actuating means 1 to act on the braking disk 7. In this case, a direct driving electric motor 105 may be used, i.e. an electric motor adapted to supply driving torque to the wheel 104 without intermediate mechanical actuating means. This solution allows obtaining a high integration of the driving actuator in the wheel. Moreover, the braking actuator may include in addition to the braking motor 3, a mechanical system including a spring and a cam to transform the motor torque on a brake force on the disk; moreover, a mechanism to compensate the wear of the brake pads, not depicted in FIG. 5a, may also be provided. Additional details concerning said mechanic braking means will be provided in the following.

Figure 5B:
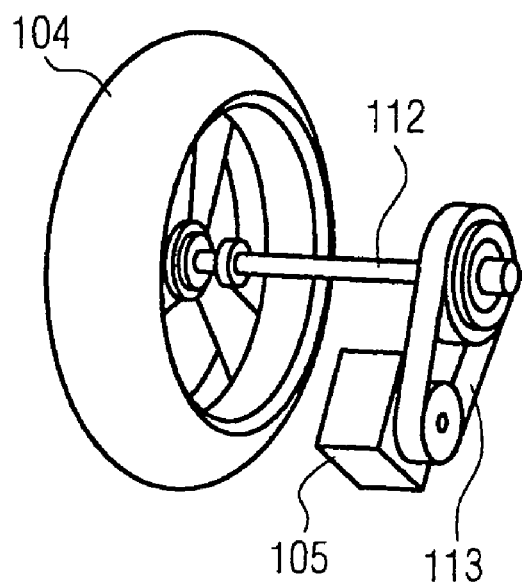

In the example depicted in FIG. 5b, the wheel 104 comprises a driving shaft 112, with the electric driving motor 105 applying the requested driving torque to said driving shaft 112 through adequate transmission means 113; in particular, in the example depicted in FIG. 5b, said transmission means 113 essentially comprise a transmission belt. However, it has to be appreciated that other transmission means may be provided, such as, for example, transmission gear boxes or the like. The solution depicted in FIG. 5b may be preferred to that depicted in FIG. 5a in all those situations in which keeping the overall dimensions of the electrical mechanical module as small as possible is not really mandatory. In fact, whilst on the one hand, the solution depicted in FIG. 5a may be preferred for the purpose of better integrating the electromechanical module into a vehicle, the solution of FIG. 5b offers evident advantages in terms of the dynamic behavior of the wheel.

Moreover, electric motors with a smaller torque and, accordingly, with lighter mass, can be adopted. Moreover, the presence of the drive shaft 112 allows placing the electric driving motor 105 far away from the wheel 104 with an optimum utilization of the volume of the vehicle. Accordingly, the disadvantages affecting the solution of FIG. 5b, essentially relating to the decreased efficiency of the power transmission, may be compensated by a more flexible reciprocal disposition of its component parts.

In the following, a first example of an electromechanical braking actuator adapted to be implemented in the electromechanical module according to the present invention will be described with reference to 2a, wherein, as usual, component parts already described above with reference to previous claims are identified by the same reference numerals.

Figure 2A:
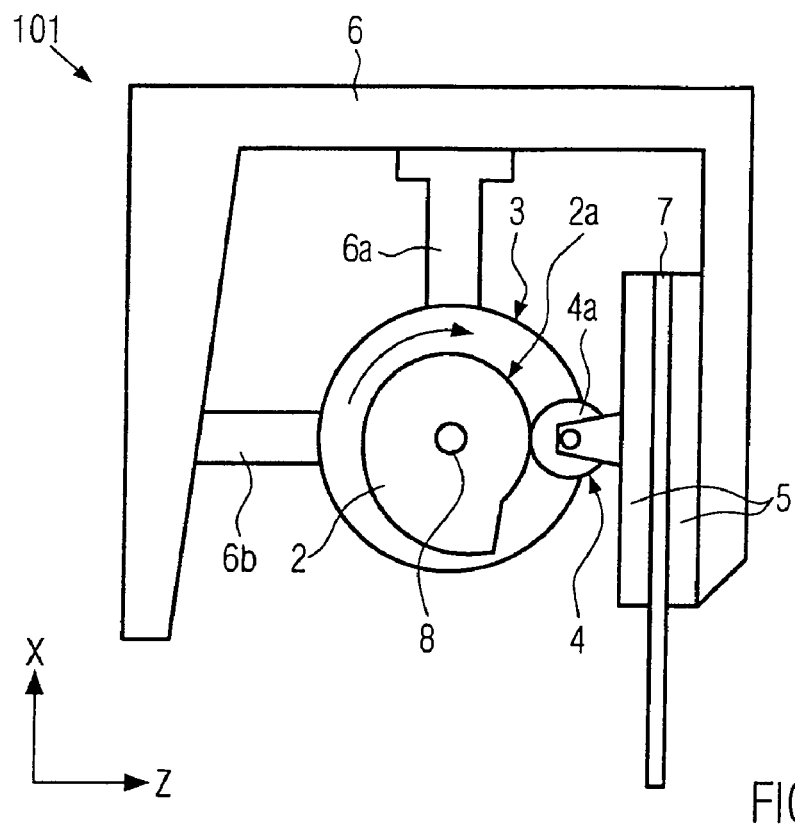
FIGS. 2a and 2b relate to side views of corresponding electromechanical braking means adapted to be exploited in the electromechanical by-wire module according to the present invention.

In particular, in FIG. 2a, said electromechanical actuator (in the following also referred to as electromechanical braking means) is identified by the reference numeral 101 whilst reference numeral 3 identifies an electric motor comprising a rotatable shaft 8. Moreover, in FIG. 2a, reference numerals 7 and 5 identify a friction element (brake disk) and two brake pads or linings, respectively, belonging to a wheel brake system of a vehicle, with both said wheel and said vehicle being not depicted in FIG. 2a for reasons of clarity. Further depicted in FIG. 2a are a frame 6 and securing and/or fixing means 6a and 6b adapted to secure the motor 3 to the frame 6. Moreover, reference numeral 2 identifies a cam element fixed and/or locked to the rotatable shaft 8, with said rotatable cam element comprising a cam surface 2a. Finally, reference numerals 4 and 4a identifies an actuating element.

In the electromechanical braking means 101 of FIG. 2a, the actuating member 4 is adapted to be displaced and/or reciprocated along the direction Z; displacing the displacing or actuating member 4 along the direction Z results in one or both of the braking elements or brake pads or linings 5 being pressed again and lifted away from the friction element or brake disk 7. To this end, devices may be provided in combination with the displacing member or actuating member 4 adapted to press both braking elements 5 against the friction element 7 and to lift both braking elements 5 away from said friction element 7. For instance, said means may comprise a caliper or a claw member of the kind only used in prior art braking systems. Said means, however, do not fall within the scope of the present invention and are not described in more detail, accordingly. For the purpose of better describing the operation of the braking means depicted in FIG. 2a the axis of rotation of the braking disk 7 is assumed to be parallel to the direction Z. The displacement of the actuating member 4 along the direction Z is obtained through a rotation of the rotatable element 2 in the direction identified by the arrows. In fact, as apparent from FIG. 2a, the rotatable element 2 comprises a cam surface 2a, abutting against the actuating member 4. Moreover, the rotatable element 2 is fixed to the shaft 8 of the motor 3. It results, therefore, that during rotation of the rotatable element 2 in the direction identified by the arrow in FIG. 1, a lateral force is exerted against the actuating member 4, which is therefore displaced in the direction Z. For the purpose of allowing the rotatable element to laterally displace the actuating member 4, the motor 3 is secured to the frame 6 by means of securing elements or means 6a and 6b; in particular, said securing elements or means 6a and 6b are provided for the purpose of avoiding the motor 3 to be displaced in the direction X and in the circumferential direction of the disk 7. Additionally, said securing means are provided for the purpose of avoiding the rotation of the stator of the motor 3 when a torque is applied to the rotatable shaft 8. Also the actuating member 4 may be provided with a rotating member or actuating element 4a abutting against the cam surface 2a of the rotatable cam element 2; in particular, such a rotatable element 4a allows the reduction of vertical (in the direction X) forces exerted by the cam element 2 on the actuating member 4 thus allowing a more useful transformation of the rotation of the rotatable cam element 2 into a lateral displacement of the actuating member 4 along the direction Z.

The principle of working of the electromechanical actuator schematically depicted in FIG. 2a may be summarized as follows. In the absence of a braking request, the rotatable cam element 2 and the actuating member 4 are kept in a standby and/or home position, with the cam surface 2a of the cam element 2 being kept either in slight contact with or in close proximity to the actuating element 4a. As soon as the need arises for a brake action, the electric motor 3 is energized, for instance as a result of a pressure exerted by the driver of the vehicle on the brake pedal, not depicted in FIG. 2a; as a result of the electrical current flowing through the electric motor 3, the shaft 8 is rotated, together with the rotatable cam element 2 in the direction of the arrow in FIG. 2a. Accordingly, the actuating element 4a is pushed by the rotatable element 2 and laterally displaced, namely in the direction Z in FIG. 2a. In this way, the two braking pads 5 are pushed against the friction element 7 so as to exert a braking action on it and, accordingly, on the wheel of the vehicle. It appears clearly that the force exerted by the rotatable cam element 2 on the actuating element 4a (and thus the force exerted by the braking pads 5 on the friction element 7) will be some way proportional to the angle reached by the rotatable cam element 8. Moreover, the braking force can be directly controlled introducing current control on the electric motor 3. At the end of the braking phase, namely as soon as no further pressure is exerted by the driver on the brake pedal, the rotatable element 2 is rotated back (i.e. in a direction contrary to the arrow in FIG. 2a) and the actuating element 4a is also displaced back until the rotatable element 2 and the actuating element 4a reach the standby position. The back rotation may be obtained as a consequence of the elastic forces generated during the braking action or, as an alternative and according to the circumstances; said back rotation may be helped by the application of an inverse torque by the electric motor 3 or even by the introduction of a spring.

The actuator 101 of FIG. 2a allows to overcome the problems affecting the prior art actuating devices; in fact, it can be appreciated that the rotatable cam element 2 allows the transformation of a relatively large rotation in an extremely small displacement (i.e. a big reduction ratio is obtained). Moreover, this large reduction ratio is obtained without all the problems affecting the prior art electromechanical devices, such as, for example, low back-drive efficiency, relatively big or heavy weight and high construction complexity. The rotatable cam element 2 is linked to the electric motor 3 which may be controlled, according to the circumstances, by the power electronic 110 and the electronic control unit 108. Moreover, the high reduction ratio obtained allows the reduction of the design torque of the motor and then its size and weight.

Of course, many amendments and/or modifications may be introduced into the electromechanical actuator as disclosed above with reference to FIG. 2a; for instance, according to the circumstances, the rotatable cam element 2 depicted in FIG. 2a may be substituted with an eccentric rotatable element, i.e. with a rotatable element eccentrically fixed to the shaft 8 of the motor 3. This solution could, in particular, simplify the construction and reduce the costs even if it could require an electric motor of a larger size.

As stated above, a modern brake actuator has to be able to recover the backlash arising due to the brake pads wear and/or consumption, in order to meet the exigencies and requirements of the car manufacturers. An example of an electromechanical braking means allowing adequately recovering and/or compensating for the backlash or wear of the pads will be disclosed in the following with reference to FIG. 2b, wherein component parts already disclosed with reference to FIG. 2a are identified by the same reference numerals.

Figure 2B:
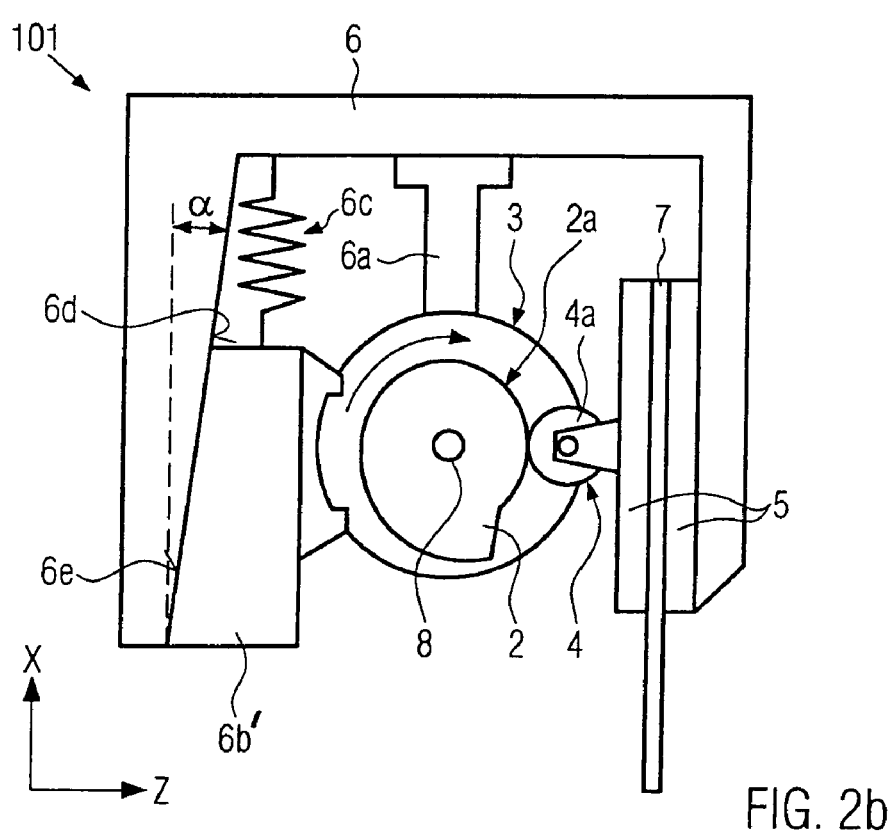

With respect to the braking means of FIG. 2a, the braking device of FIG. 2b additionally comprise displaceable means 6b' through which the motor 3 is secured to the frame 6 and displacing means 6c adapted to displace said displaceable means 6b'. Moreover, in FIG. 2b, reference numerals 6d and 6e identify two facing sliding surfaces, provided on the frame 6 and the displaceable means 6b', respectively. In the embodiment depicted in FIG. 2b, the displaceable means 6b' comprises a slide element; on the one side (the right side in FIG. 2b), the slide element of displaceable means 6b' is kept into abutment with a corresponding surface portion of the motor 3 whilst, on the opposite side (the left side in FIG. 2), the sliding surface 6e of the slide element of displaceable means 6b' is kept into abutment with a corresponding, facing surface 6d of the frame 6, in such a way that the sliding surface 6e may slide on the surface 6d of the frame 6, during displacement of the slide element in the X direction (the vertical direction in FIG. 2b). Moreover, the displacing means 6c comprises a resilient element, for instance a resilient spring and are adapted to displace the slide element of the displaceable means 6b' in the vertical direction as it will be explained in more detail below. Displacing the slide element of displaceable means 6b' along the X direction results in the motor 3 being laterally displaced together with the rotatable element 2 in the Z direction in FIG. 2. Additional securing means 6a are further provided in the embodiment of FIG. 2b for fixing the electric motor 3 to the frame 6; in particular, these securing means 6a are such as to constrain the electric motor 3 in the X direction. Accordingly, in the embodiment of FIG. 2b, the motor 3 and the rotatable element 2 may not be displaced in the X direction (even not during displacement in the same direction of the slide element of the displaceable means 6b') whilst the motor 3 may be displaced in the Z direction, i.e. in the actuating direction of the actuating member 4.

During the braking phase, the braking means of FIG. 2b works in a way similar to that of the braking means disclosed above with reference to FIG. 2a; that is, as soon as a braking action is requested (for instance, due to a pressure exerted by the driver on a brake pedal), the rotatable element 2 is rotated as indicated by the arrow in FIG. 2 and the actuating member 4 is displaced in the Z direction, thus resulting in the braking pads 5 being pressed against the friction element or brake disk 7. In the same way, the backward rotation of the rotatable element 2 (and the corresponding backward displacement of the actuating element 4) till the standby position is reached in a way similar to that of the braking means of FIG. 2a. However, in the absence of any braking action, a backlash recovery step is carried out, so as to compensate the backlash due to the wear of the brake pads and/or friction element 7. This is due to the fact that in the absence of any braking action, and thus in the absence of any brake force acting in the direction Z, the spring 6c pulls the slide element of the displaceable means 6b' in the X direction; accordingly, as a result of the slope of the slide element of the displaceable means 6b' and the frame 6 placed at an angle α, the motor 3 is displaced together with the cam element 2 in the Z direction, till the surface 2a of the rotatable element 2 is brought into light contact with the actuating member 4, eventually comprising a rotatable or actuating element 4a; therefore, also the brake pads 5 are brought into light contact with the friction element 7. However, the stiffness and preload of the spring 6c may be designed so as to allow a displacement of the motor 3 in the Z direction with an adequate recovery of the backlash, but without producing an unwanted braking action. On the contrary, during the braking phase, the brake forces acting in the Z direction locks the slide against the sliding surface 6d of the frame thus avoiding any displacement of the slide 6b due to the pulling action of the resilient spring 6c.

The actuator depicted above with reference to FIG. 2b, even if based upon a quite simple concept, has been revealed to be particularly useful for the purpose of allowing an adequate recovery of the backlash; this is in particular due to the fact that the braking phase and the recovery phase are kept separate, with the result that the slide and, correspondingly, the motor 3 and the rotatable element 2, may only be displaced outside of the braking phase, since, during the braking phase, the lateral forces arising lock the slide against the surface of the displaceable means 6d'. Of course, also in the case of the embodiment of FIG. 2b, many amendments or modifications may be introduced according to the circumstances; for instance, the backward rotation of the motor 3 and the rotatable element 2 may be obtained either as a result of the inverse torque arising or through the application of an inverse torque by the electric motor 3. Moreover, also in this case, the cam element 2 may be substituted with an eccentric element. Finally, the braking force can be directly controlled introducing a current control on the electric motor 3.

In the following, further electromechanical braking means suitable to be implemented in the electromechanical module according to the present invention will be described with reference to FIGS. 3a and 3b, wherein, as usual, component parts already described with reference to previous figures are identified by the same reference numerals.

Figure 3A:
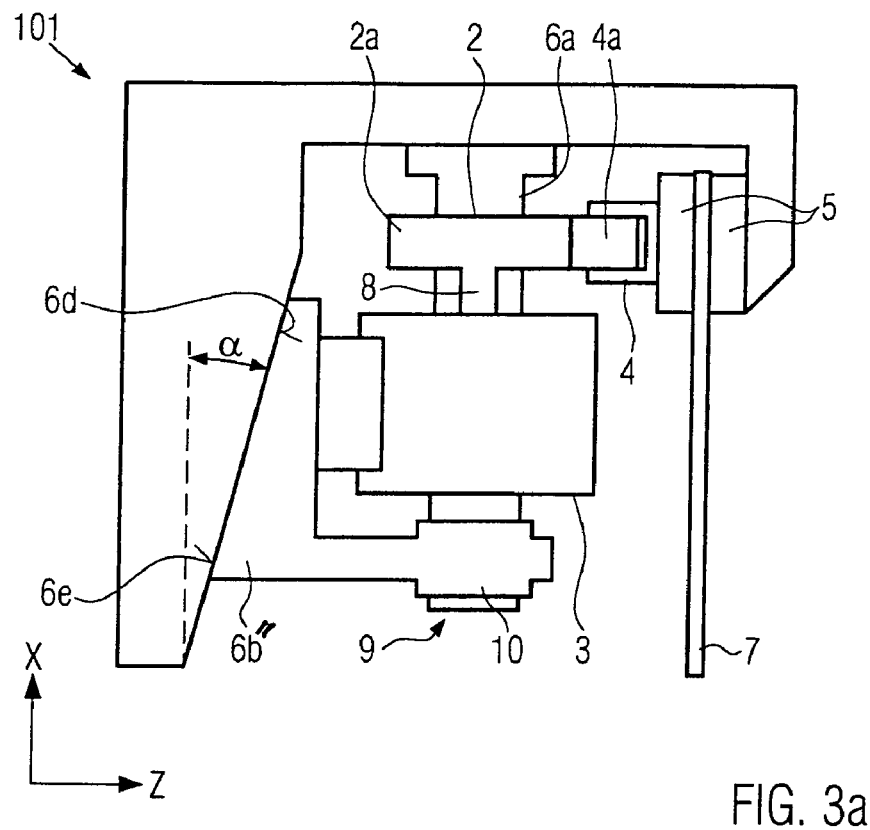
FIGS. 3a and 3b relate to corresponding top views of further braking means adapted to be exploited in the electromechanical by-wire module according to the present invention.

The most important difference between the actuator of FIG. 3a and that of FIG. 2b, relates to the fact that, in the actuator of FIG. 3a, the recovery of the backlash is obtained through an efficient exploitation of the rotation of the motor 3, in particular of the reverse torques arising there from. To this end, the braking means 101 of FIG. 3a comprise a screw element 9 received in a corresponding, threaded nut element 10 firmly fixed to the slide 6b". Accordingly, in the actuator of FIG. 3a, the slide 6b" is displaced in the X direction as a result of the rotation of the screw element 9 as it will be disclosed in more detail in the following.

During the braking phase, the actuator of FIG. 3a behaves just as that of FIG. 2b; accordingly, also in the embodiment of FIG. 3a, the rotatable shaft 8 of the electric motor 3 is linked to a rotatable element 2 with an abutting surface abutting against an actuating member 4, eventually also comprising a rotatable or actuating element 4a. Accordingly, as a result of the rotation of the rotatable element 2, the actuating member 4 is laterally displaced so that the braking pads 5 are pushed against the friction element 7, whilst, during backward rotation of the rotatable element 2, the braking pads 5 are lifted away from the friction element 7. Moreover, also in the braking means 101 of FIG. 3a, the cam and the motor are constrained along the axis of the motor, i.e. in the X direction in FIG. 3a; however, the motor 3 can be displaced together with the rotatable element 2 in the Z direction as a result of the displacement of the slide 6b" in the X direction. In the embodiment of FIG. 3a, the screw element 9 is locked and/or firmly fixed to the stator of the motor 3; alternatively, the screw or threaded element 9 may even be part of the stator of the motor 3. During the braking phase, i.e. during rotation of the rotatable element 2 in the forward direction, the stator of the motor would tend to be rotated in the backward direction as a result of the reverse torque arising; however, the slope of the slide 6b", the angle α, and the interface between the stator of the motor and the slide 6b" are designed in such a way that during the braking phase, the slide is locked due to the resulting pressure exerted by the slide on the surface 6d of the frame 6, so that the stator of the motor 3 can not rotate. That is to say that the slope of the slide is designed in such a way that during the braking phase, the force acting on the bolt element 10 and between the stator of the motor 3 and the slide 6b" as a result of the reverse torque arising, will not be sufficient to displace the slide 6b" in the X direction in FIG. 3a. At the end of the braking phase, the rotatable element 2 is rotated in the backward direction (i.e. in the direction contrary to the direction identified by the arrow in FIG. 2), either due to the resulting reverse torque or due to the application of an inverse rotation by the electric motor 3. In particular, during its backward rotation, the rotatable element 2 is brought back to its standby or home position where it is locked by means of a back locking device (not depicted in FIG. 3a). As soon as the rotatable element 2 reaches the home position (and is, therefore, locked in this position by the back locking device) a reverse torque arises, rotating the stator of the motor and the threaded element 9 in the forward rotating direction. Accordingly, since during this phase no lateral forces are exerted, the rotation of the screw element 9 inside the nut or bolt element 10 will result in a displacement of the slide 6b" in the X direction. It appears, therefore, clearly that the motor group comprising the motor and the rotatable element will be displaced in the Z direction as a result of the approaching of the slide 6b". The rotatable element 2 will, therefore, be brought into abutment with the actuating member 4 and the brake pads 5 will be brought in light contact with the friction element 7. However, also in this case, the slope of the slide 6b" (and/or of the sliding surface 6d of the frame 6) may be designed so as to allow the displacement of the motor group into the Z direction and the resulting backlash recovery, without producing an unwanted braking action.

Figure 3B:
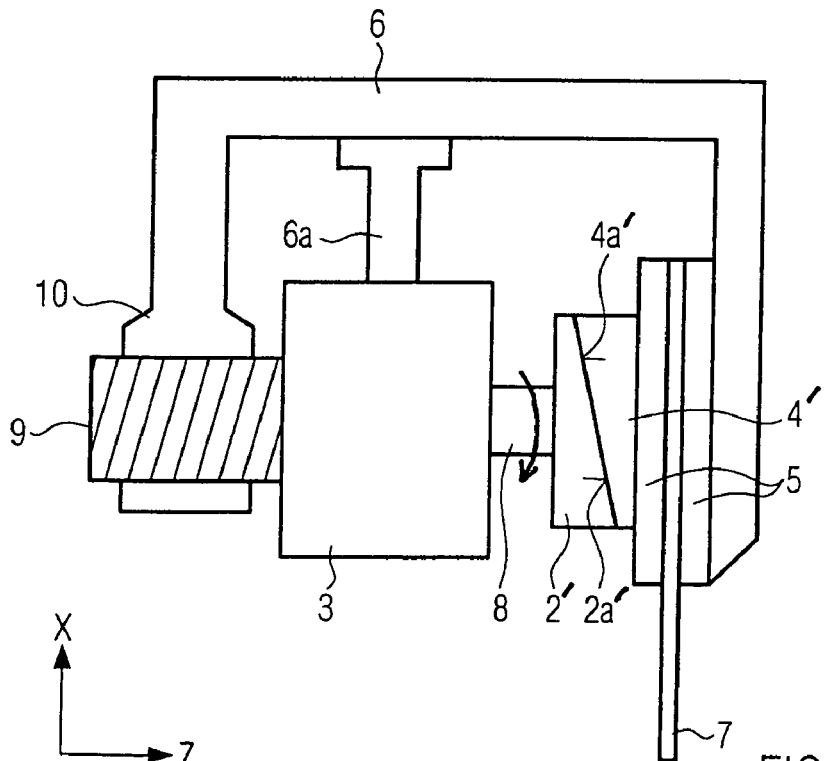

The embodiment of FIG. 3b behaves as that of FIG. 3a. The main difference between the two embodiments relates to the fact that, in that of FIG. 3b, an axial cam is adopted. The rotatable shaft 8 of the electric motor 3 is linked to a rotatable element 2 with an abutment surface 2a' abutting against a corresponding surface 4a' of an actuating member 4'. Accordingly, as a result of the rotation of the rotatable element 2' in the rotating sense indicated by the arrow in FIG. 3b, the actuating member 4' is laterally displaced so that the braking pads 5 are pushed against the friction element 7, whilst, during backward rotation of the rotatable element 2, the braking pads 5 are lifted away from the friction element 7. The motor 3 can be displaced together with the rotatable element 2 in the Z direction as a result of the rotation of the stator of the motor. To this end, in the embodiment of FIG. 3b, the screw element 9 is locked and/or firmly fixed to the stator of the motor 3; alternatively, the screw or threaded element 9 may even be part of the stator of the motor 3. During the braking phase, i.e. during rotation of the rotatable element 2 in the forward direction indicated by the arrow, the stator of the motor would tend to be rotated in the backward direction as a result of the reverse torque arising; however, the pitch of the screw element 9 and its diameter are designed in such a way that during the braking phase, the stator of the motor 3 is locked due to the friction torque produced between the screw 9 and the nut 10. That is to say that the screw 9 and the nut 10 are designed in such a way that during the braking phase, the force acting on the actuating member 4', will induce a friction torque between the screw 9 and the nut 10 that avoids all rotations of the stator of the motor 3. At the end of the braking phase, the rotatable element 2' is rotated in the backward direction (i.e. in the direction contrary to the direction identified by the arrow in FIG. 2), either due to the resulting reverse torque or due to the application of an inverse rotation by the electric motor 3. In particular, during its backward rotation, the rotatable element 2' is brought back to its standby or home position where it is locked by means of a back locking device (not depicted in FIG. 3*b*). As soon as the rotatable element 2' reaches the home position (and is, therefore, locked in this position by the back locking device) a reverse torque arises, rotating the stator of the motor and the threaded element 9 in the forward rotating direction indicated by the arrow. Accordingly, since during this phase no forces in the axial direction of the screw (Z direction) are exerted, the rotation of the screw element 9 inside the nut or bolt element 10 will be possible and will result in a displacement of the motor together with the rotatable element 2' in the Z direction. The rotatable element 2' will, therefore, be brought into abutment with the actuating member 4' and the brake pads 5 will be brought in light contact with the friction element 7. However, also in this case, the pitch and the diameter of the screw 9 and nut 10 may be designed so as to allow the displacement of the motor group into the Z direction and the resulting backlash recovery, without producing an unwanted braking action. An alternative embodiment could exploit a torsional spring of appropriate preload and stiffness to generate the torque on the stator of the motor 3 to produce its rotation during the backlash recovery phase.

The advantages offered by the embodiments depicted above with reference to FIGS. 3*a* and 3*b* with respect to the previous embodiments as depicted with reference to FIGS. 2*a* and 2*b* relate to the fact that the embodiments of FIGS. 3*a* and 3*b* allow an active control of the pads wear recovery phase, meaning that the force displacing the motor 3 and the rotatable element 2 and 2' is now controlled and kept constant over the whole backlash recovery phase and over all the wear range. Moreover, concerning possible modifications of the actuators of FIGS. 3*a* and 3*b*, the same considerations apply as pointed out with respect to the two previous embodiments. Accordingly, as stated above, the rotation of the rotatable element 2 and 2' in the backward direction may be obtained through application of an inverse torque by the electric motor. Moreover, also in this case, an eccentric element may be used instead of the cam element. Furthermore, since in the present case, the motor stator can rotate, some special kind of electric connections may be used. Finally, with reference to the embodiment of FIG. 3*a*, adequate securing means 6*a* may be used to constrain the motor group along the axis of the motor, i.e. in the X direction in FIG. 3*a*.

In the following, still a further example of an electromechanical actuator adapted to be exploited in the electromechanical module according to the present invention will be described with reference to FIG. 4; again, component parts depicted in FIG. 4 and already described with reference to previous figures are identified by the same reference numerals.

Figure 4:
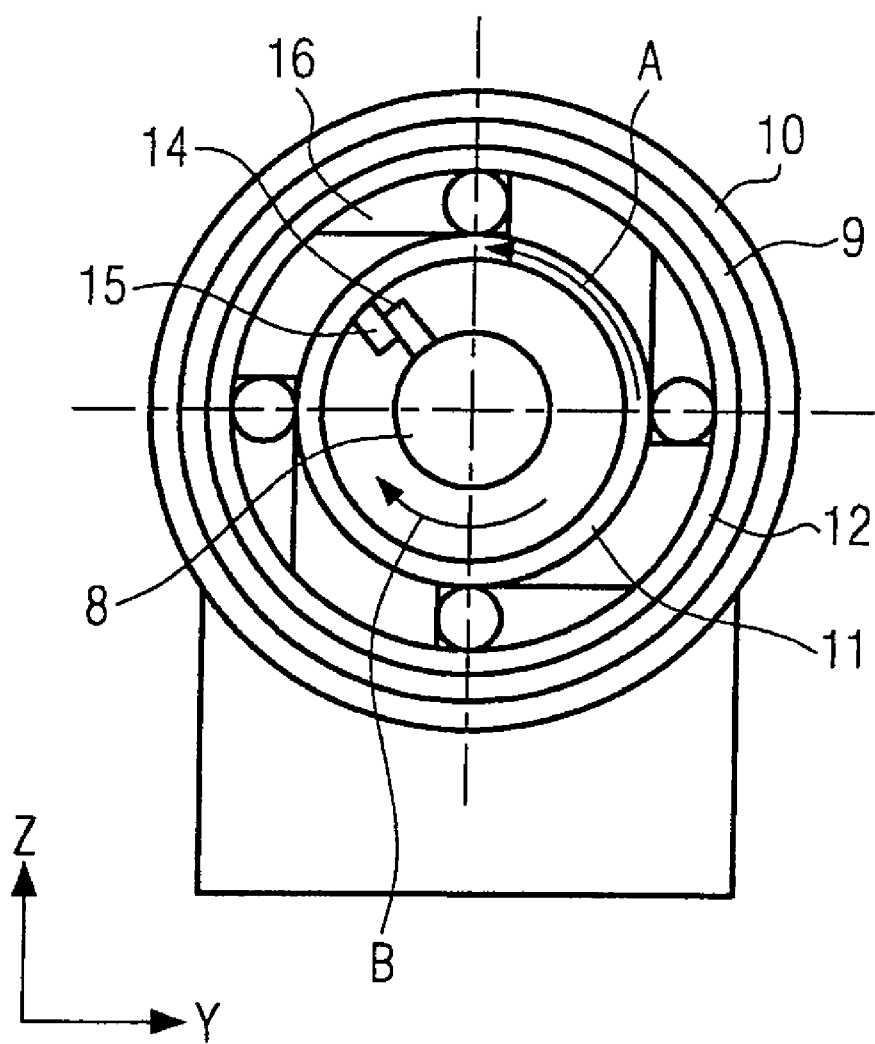
FIGS. 4 and 4a to 4d relate to rear views of further electromechanical braking means adapted to be exploited in the electromechanical by-wire module according to the present invention.

In FIG. 4, only the motor group of the electromechanical actuator and/or braking means is depicted whilst other component parts such as, for instance, the frame supporting the motor group, the slide to be used in combination with the motor group, as well as the rotatable element, the abutting actuating element, the brake pads and the friction element are omitted for reason of clarity; however, it has to be understood that the motor group of FIG. 4 is adapted to be implemented in an actuator as depicted in FIGS. 3*a* and 3*b*, i.e. in combination with those component parts depicted therein. Moreover, it has also to be noted that in FIG. 4, there is depicted a back view of the motor group, i.e. a view of the back side, opposite to the side where the rotatable element is provided. When the motor group of FIG. 4 is implemented in an actuator, for instance in the actuators of FIGS. 3*a* and 3*b*, the resulting brake phase is similar to the brake phase as disclosed above with reference to FIGS. 3*a* and 3*b*; that is to say that the braking result is obtained through rotation of the rotatable element fixed to the shaft 8, and the corresponding displacement of the actuating member resulting in a corresponding pressure being exerted by the braking pads on the friction element. However, the motor group of FIG. 4 differs from that of FIG. 3, in the way the backlash recovery is executed; in fact, whilst the backlash recovery phase is still based on the exploitation of the rotation of the motor (either of the case or of the stator), in the present case, the motor case cannot be rotated, while the screw element 9 is free to rotate relative to it. To this end, a free wheel 16 is interposed between the shaft 8 and the screw element 9, with this free wheel 16 comprising an inner ring 11 and an outer ring 12. Moreover, the expression "free wheel" has to be understood as meaning that the inner ring 11 may be freely rotated with respect to the outer ring 12 in the rotating direction B or, in other words, that when the inner ring 11 is rotated in the direction B, the outer ring 12 is not rotated; on the contrary, when the inner ring 11 is rotated in the backward rotating direction A, also the outer ring is rotated in the same backward rotating direction A. Furthermore, the outer ring 12 is firmly fixed and/or locked to the screw 9, which, in turn, is received inside the nut 10. As depicted in FIG. 4, the motor shaft 8 comprises a first key or protruding portion 14 fixed to the motor shaft 8 and adapted to cooperate with a second key or latching element 15 of the inner ring 11. As it will become more apparent with the following description, the purpose of the latching member 15 is that of allowing the outer ring to be rotated by the rotating shaft 8 in the backward rotating direction A.

Figure 4A:
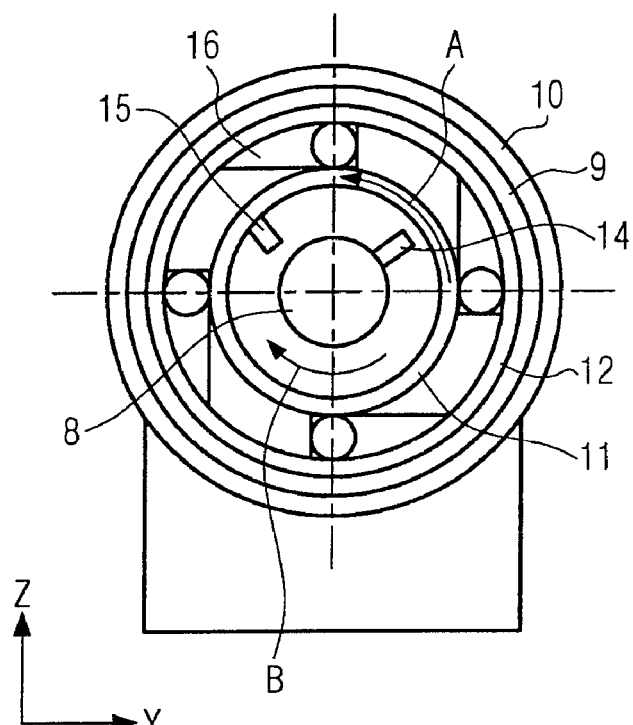
Figure 4B:
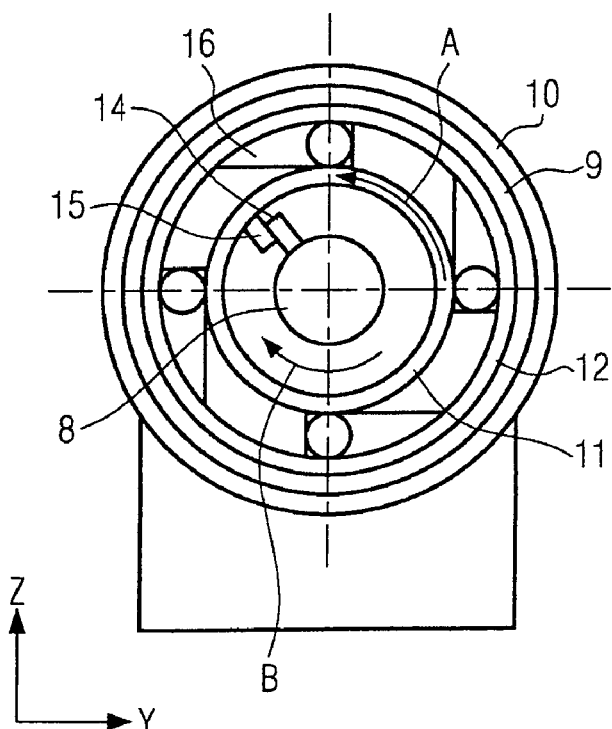
Figure 4C:
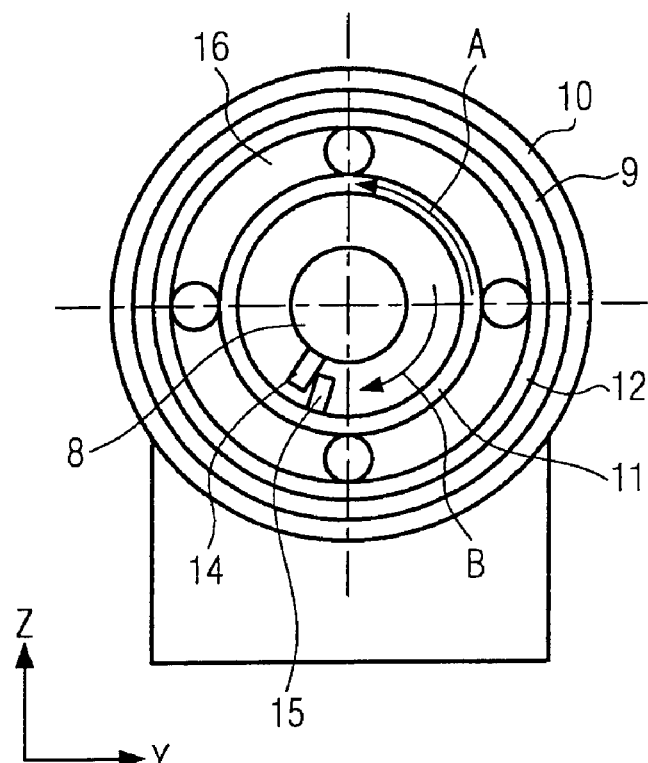

The function of the motor group of FIG. 4 and, therefore, the functioning of a corresponding electromechanical actuator implementing this motor group will be described in the following with respect to FIGS. 4 and 4*a* to 4*d*. During the braking phase, the behavior of an actuator implementing the motor group of FIG. 4 is similar to that of the actuator disclosed above with reference to FIGS. 3*a* and 3*b*; accordingly, during the braking phase, the rotatable element (not depicted in FIGS. 4 and 4*a* to 4*d*) is rotated in the direction of rotation identified in FIG. 4 by the arrow B so that the actuating member (also not depicted) is laterally displaced and the braking pads are pushed against the friction element; during the braking phase, the motor group is not displaced due to the friction forces arising. At the beginning of the braking phase, the protruding portion 14 and the latching element 15 are reciprocally disposed in the position depicted in FIG. 4 with this position corresponding to the standby or home position of the rotatable element. As soon as a braking action is requested, a corresponding braking phase is started meaning that the shaft 8 is rotated, together with the rotatable element in the direction of the arrow B; accordingly, neither the inner ring 11 nor the outer ring 12 are rotated since no action is exerted by the protruding portion 14 on the latching means 15. In other words, at the beginning of the braking phase and during the braking phase, neither the inner ring 11 nor the outer ring 12 are rotated either in the direction of the arrow B or in the contrary direction, so that no rotating impulses are given to the screw element 9 firmly fixed to the outer ring 12. The position assumed by the rotating shaft 8 and the inner ring 11, in particular the reciprocal position assumed by the protruding portion 14 and the latching means 15 at the end of the braking phase is depicted in FIG. 4*a*; in particular, as apparent from FIG. 4*a*, at the end of the braking phase, the latching member 15 is still in the position assumed at the beginning of the braking phase (home position). As soon as the braking phase is finished or stopped, the motor shaft 8 is rotated in a backward direction, i.e. in the direction A contrary to that identified by arrow B. Accordingly, the latching member 15 is not engaged by the protruding portion 14 until the protruding portion 14 reaches again its home position (see FIG. 4b): That means that solely the shaft 8 is rotated in the direction A until the protruding portion 14 reaches its home position (see FIG. 4b). However, as soon as the rotating shaft 8 (and the protruding portion 14) reaches again the home position, any further rotation of the shaft 8 in the direction A produces an engagement of the protruding portion 14 with the latching means 15 resulting therefore in the inner ring 11 being also rotated in the backward direction A (see FIG. 4c). Moreover, also the outer ring 12 is rotated in the backward direction A the same amount of the inner ring 11 due to the action of the free wheel. Accordingly, also the screw element 9 is rotated in the backward direction A so that the nut threaded element 10 receiving said screw element 9 is displaced in a sense that approaches the motor cam group to the frame so that a backlash recovery is carried out. The position assumed by the rotating shaft 8, in particular by the protruding portion 14 and the latching member 15 at the end of the backlash recovery phase is that depicted in FIG. 4c.

Figure 4D:
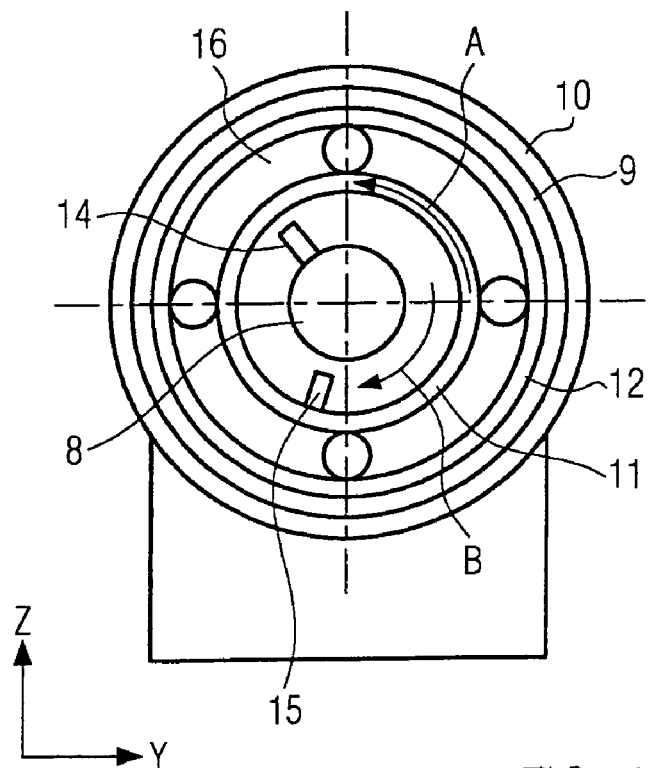

As soon as the backlash recovery phase has been completed the shaft 8 is rotated again in the forward direction B until the shaft 8 and the protruding portion 14 reach again the home position (see FIG. 4d). Moreover, during this further forward rotation of the shaft 8 not solely the shaft 8 is rotated although no action is exerted by the protruding portion 14 on the latching member 15; on the contrary, also the inner ring 11 is rotated in the forward direction B by means of resilient means such as a spring (not depicted in the figures) until the inner ring 11 also reaches the home position with the protruding portion 14 and the latching member 15 being again reciprocally disposed as depicted in FIG. 4, thus preparing the motor-cam group for a new braking phase and a new recovery phase.

In the following, with reference to FIG. 6, an example of a possible electrical layout of the electromechanical module of FIG. 1b will be disclosed; also in the case of FIG. 6, those component parts already disclosed above with reference to previous figures are identified by the same reference numerals.

Figure 6:
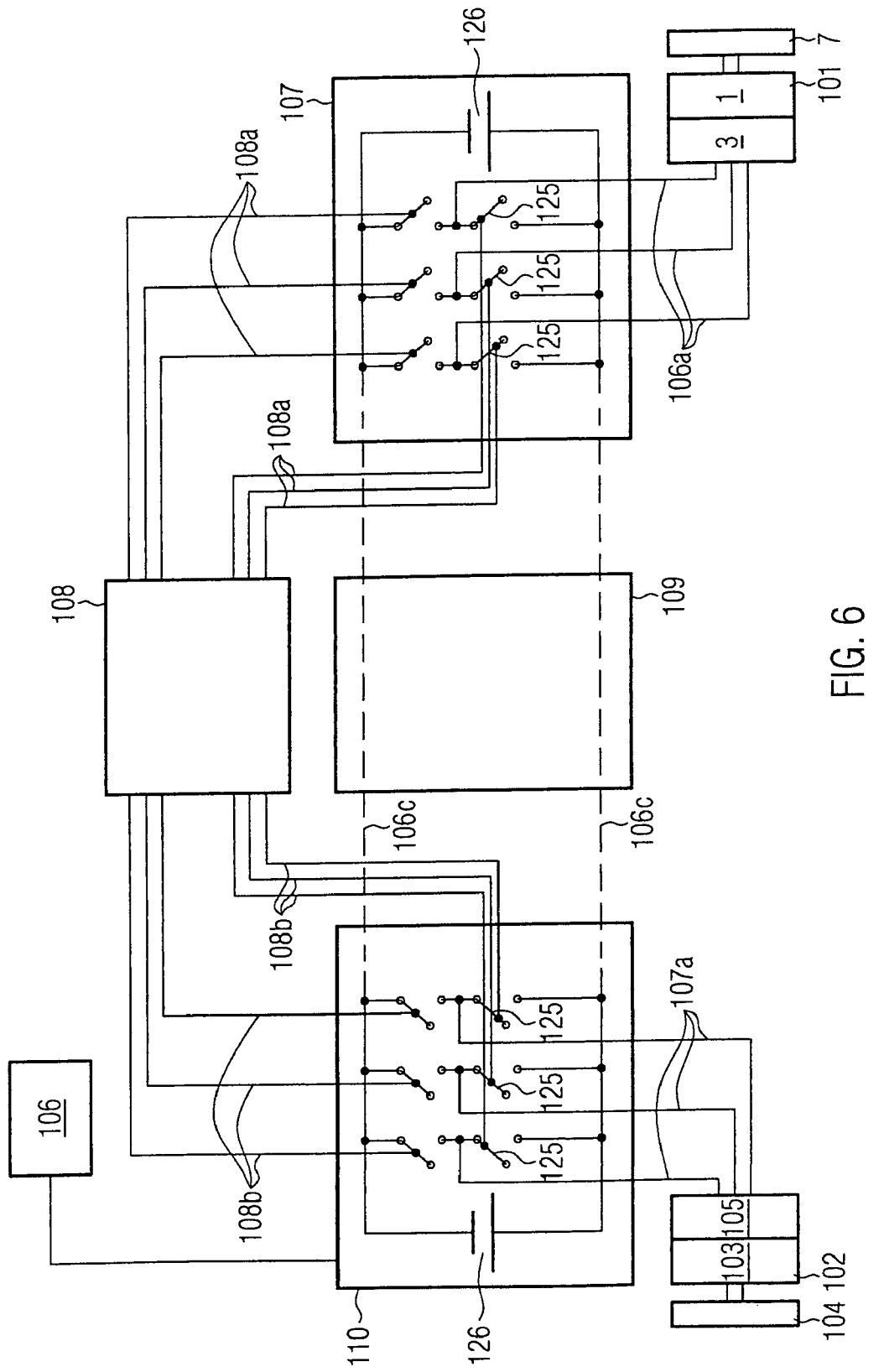
FIG. 6 relates to a schematic view of the electrical layout of the embodiment of the electromechanical by-wire module according to the present invention as depicted in FIG. 1b.

As apparent from FIG. 6, each of the two power electronic units 110 and 107 comprises a plurality of switching devices 125 connected in parallel and a capacitor bank 126 also connected in parallel with said plurality of switching devices 125; in the particular embodiment depicted in FIG. 6, each switching device 125 comprises two switching means connected in series. For instance, said switching means may comprise bipolar transistors, mosfet transistors or the like. The functioning of the switching devices 125, in particular, the functioning of the switching means is controlled by the control unit 108 through connecting lines 108b and 108a, through which each single switching means may be activated, i.e. switched on or switched off. Moreover, each switching device of the power electronic unit 110 is connected through connecting lines 107a with the electric motor 105 which is, in turn, mechanically connected and/or coupled with a corresponding wheel 104 through the mechanical actuating means 103. In the same way, each switching device 125 of the power electronic unit 107 is connected with the electric motor 3 through a corresponding connecting line 106a, with said motor 3 being mechanically coupled or connected with a corresponding wheel 7 through actuating means 1. Moreover, the two power electronic units 110 and 107 are reciprocally connected through the connecting lines 106c (represented in FIG. 6 by the dashed lines) and a third power electronic unit 109.

The functioning of the module depicted in FIG. 6 may be summarized as follows where, for reasons of clarity, it will be assumed that electrical power is collected from the electric motor 105 and transferred at least partially to the electric motor 3.

As soon as the need arises of collecting electrical power from the electric motor 105, for instance due to the arising need of exerting a strong braking action on the wheel 104, the switching means of the power electronic unit 110 are switched on as a result of signals supplied by the control unit 108 to the power electronic unit 110 through the connecting lines 108b; this results in a direct current being generate and the capacitor bank 126 being loaded accordingly, so that a voltage is generated at both ends of the capacitor bank 126.

Due to the connecting lines 106c, the same voltage also arises at the input side (the left side in FIG. 6) of the power electronic unit 109; moreover, the power electronic unit 109 is conceived so as to provide a constant voltage at its output side (the right side in FIG. 6). It results, therefore, that a constant voltage is applied to the capacitor bank 126 of the power electronic unit 107. Accordingly, if the switching means of the switching devices 125 of the power electronic unit 107 are also switched on (for instance due to corresponding signals supplied by the control unit 108 to the switching devices 125 through the connecting lines 108a due to an arising need for strong braking), electrical current is also generated which may be transferred to the electric motor 3 through the connecting lines 106a, resulting in the braking means 1 being activated and a braking action being exerted on the braking disk 7.

The electrical layout disclosed above with reference to FIG. 6 has been revealed to particularly advantageous in the case of three phase electric motors working with alternating current; however, the same working principle may be applied in the case of other solutions such as, for example, monophase motors working with direct current. In the same way, a different number of switching devices and/or switching means may be divided in each power electronic unit according to the circumstances. Moreover, as stated above, dissipating means or equivalent means may be provided between the two power electronic units 110 and 107 for the purpose of at least partially dissipating the electrical power collected from the motor 105 in the case that the collected electric power does not need to be entirely transferred to the braking motor 3.

In the following with reference to FIGS. 7a and 7b, corresponding examples will be disclosed of the way the electromechanical module according to the present invention may be exploited in a vehicle. In all the examples depicted in FIGS. 7a and 7b, it is assumed that the electromechanical modules depicted therein comprise at least the electromechanical driving means 102 and the electromechanical braking means 101 disclosed above, wherein said electromechanical driving means comprise at least one electric driving motor 105 whilst said electromechanical braking means comprise at least said electric braking motor 3. Moreover, it is also assumed that said electromechanical modules comprise at least two power electronic units electrically connected to said electromechanical driving and braking means, respectively, as well as a control unit adapted to control the function of said two power electronic units. Moreover, depending thereon whether electromechanical modules as depicted in FIG. 1a or in FIG. 1b are exploited, said electromechanical modules may further comprise a third power electronic unit electrically connected to said two power electronic units. Finally, said electromechanical modules may comprise one or more battery packs or the main battery pack of the vehicle may be used for activating said electromechanical modules. In the particular example depicted in FIG. 7a, two electromechanical modules 100 according to the present invention are used, with each of said electromechanical modules acting on one of the two rear wheels 104 of the vehicle 115 depicted therein. Moreover, in the vehicle 115 of FIG. 7a, the two front wheels 104 are driven by a main engine, for instance a combustion engine schematically illustrated as 116, through a mechanical differential 119. As apparent from FIG. 7a, sensing means 130 are provided for the purpose of collecting data relating to the driving condition and/or to the dynamic behavior of the wheels so that corresponding signals may be supplied to the two electromechanical modules 100 as a result of the data collected. The solution depicted in FIG. 7a allows realizing a four wheel hybrid vehicle without any need of modifying the main power train of the vehicle. The rear wheels 104 may, therefore, be used for improving the traction capability of the vehicle under normal driving conditions and for improving the performances of the vehicle under difficult conditions such as, for example, during cornering, during driving on ice or snow or even in the case that strong braking is required.

Figure 7A:
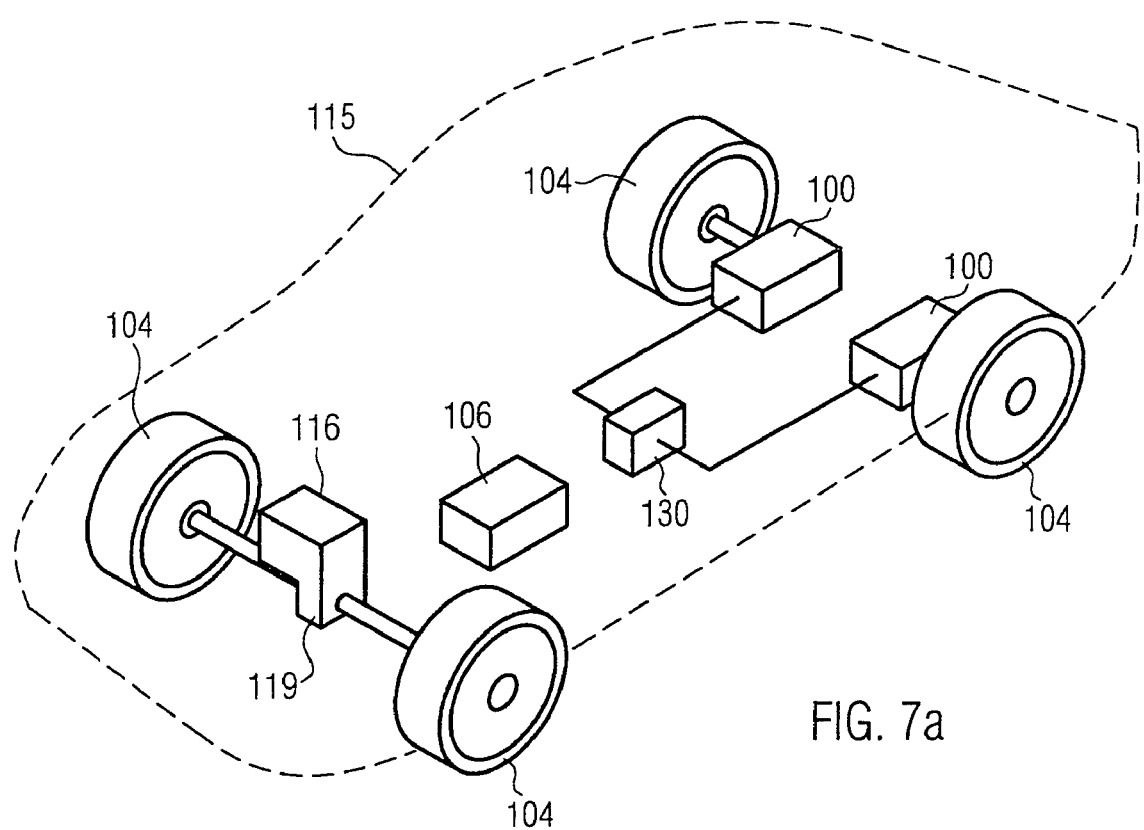
FIGS. 7a and 7b relate to schematic views of corresponding examples of the way the electromechanical module according to the present invention may be exploited in a vehicle.
Figure 7B:
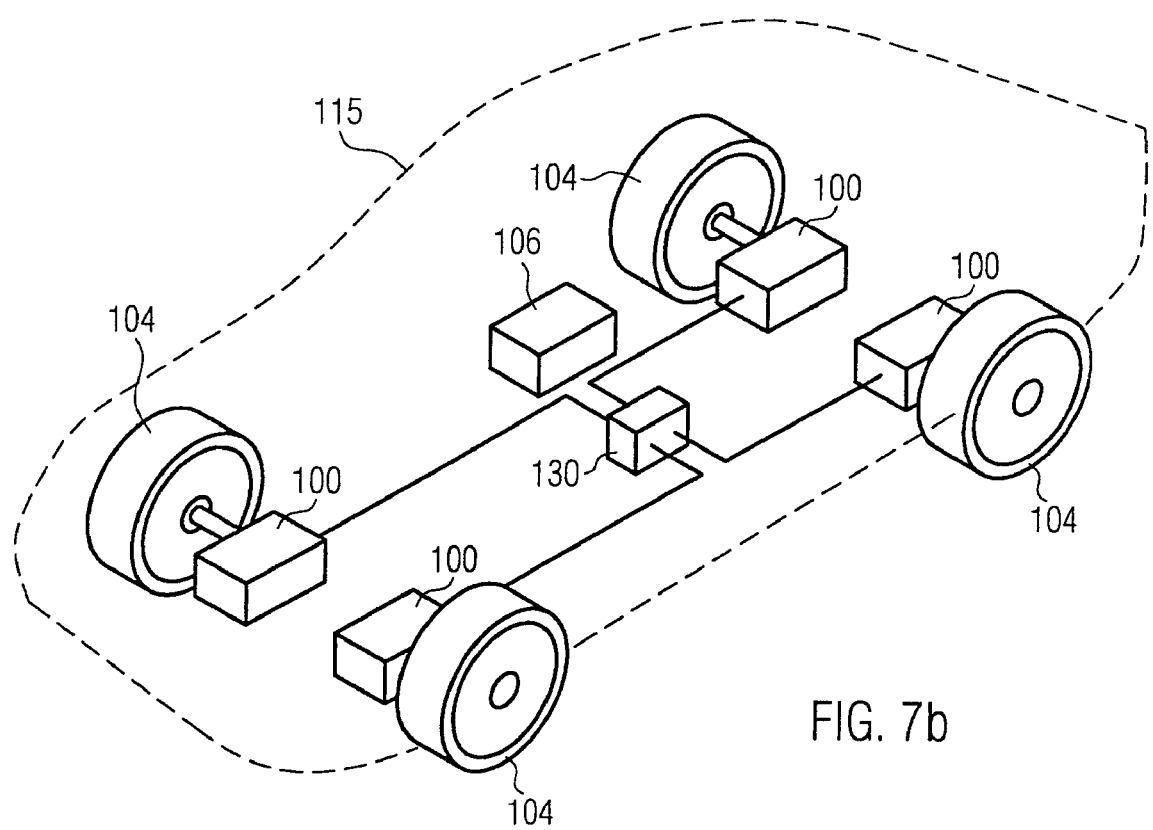

In the example depicted in FIG. 7b, four electromechanical modules 100 according to the present invention are exploited in the vehicle 115 depicted therein, whilst said vehicle is not provided with an additional main engine; accordingly, the driving functions is carried out by the four modules 100 so that a truly electric vehicle is obtained, with all the advantages offered by the electromechanical module of the present invention.

Of course, it has to be noted that other ways of exploiting the electromechanical module according to the present invention in a vehicle are also possible in addition to those disclosed above with reference to FIGS. 7a and 7b; for instance, the electromechanical module according to the present invention may be exploited in a three wheeled vehicle or even in vehicles comprising more than four wheels. Moreover, the electromechanical module according to the present invention may also be exploited in the case of wheeled tilting vehicles.

In conclusion, it results from the disclosure given above that the electromechanical module according to the present invention allows to overcome, at least partially, the problems affecting the prior art electromechanical modules. In particular, the electromechanical module according to the present invention allows performing both the driving and braking functions by means of corresponding electromechanical driving and braking means controlled by a unique control unit. Moreover, additional advantages offered by the electromechanical module according to the present invention may be summarized as follows.

More safety is obtained due to the presence of corner by-wire module which allows control of the behavior of each single wheel in any condition; moreover, as stated above, the introduction of the corner by-wire module according to the present invention on each wheel of a vehicle permits to realize a truly electrical vehicle. Furthermore, adopting a corner by-wire module according to the present invention at least on the wheels of the same axial allows obtaining an improved dynamic control of the vehicle. The electromechanical module may also be used as a differential electromechanical module, thus increasing the efficiency of the transmission, the electronic traction control; moreover, the advantages of an electronic ABS system are also obtained. The electromechanical module according to the present invention also increases the comfort of the driver because the driver's efforts on the brake pedal may be reduced with respect to the traditional solutions. Additionally, since the driver's muscular power is not used to energize the brake system, alternative forms of braking actuators can be devised. The presence of a control unit on each wheel equipped with a corner by-wire module according to the present invention guarantees more safety because the monitoring system can be integrated to detect the status of the wheel and a possibility of failure. Exploiting the electromechanical module according to the present invention also allows stopping the vehicle in the case of a failure in the brake system; the braking torque generated by the driving motor can be used to stop the vehicle when the electromechanical braking means have a failure. This failure may furthermore be detected by the control unit so that the driving function of the driving motor can be stopped. With respect to additional brake by-wire solutions, less electric power is required from the vehicle electric system, in particular from the battery pack of the vehicle; in particular, this is due to the fact that the driving motor can be used in a generating mode so that electric power can be supplied to the braking motor, for instance in the case of emergency braking.

Of course, it should be understood that a wide range of changes and modifications can be made to the embodiments described above without departing from the scope of the present invention. It has to be, therefore, understood that the scope of the present invention is not limited to the embodiments disclosed but is defined by the appended claims.

Further modifications and variations of the present invention will be apparent to those skilled in the art in view of this description. Accordingly, the description is to be construed as illustrative only and is for the purpose of teaching those skilled in the art the general manner of carrying out the present invention. It is to be understood that the forms of the invention shown and described herein are to be taken as the presently preferred embodiments.

What is claimed is:

1. An electromechanical module adapted to act on a single wheel of a vehicle so as to perform both the driving function and the braking function on said wheel, comprising:

first electromechanical driving means adapted to perform said driving function on said single wheel, second electromechanical braking means adapted to perform said braking function on friction means of said single wheel, means for controlling the supply of electrical power to each of said first electromechanical driving means and second electromechanical braking means, wherein said means for controlling the supply of electrical power to each of said first electromechanical driving means and second electromechanical braking means comprise a first power electronic unit electrically connected to said first electromechanical driving means, a second power electronic unit electrically connected to said second electromechanical braking means, and a control unit electrically connected to each of said first and second power electronic units, wherein said first electromechanical driving means comprise a first electric driving motor electrically connected to said first power electronic unit, and adapted to provide the driving torque for performing said driving function, and first mechanical actuating means adapted to be mechanically coupled to said single wheel, and said second electromechanical braking means comprise a second electric motor electrically connected to said second power electronic unit and second actuating means adapted to be activated by said second electric motor so as to perform said braking function on the friction means of said single wheel.

2. An electromechanical module as claimed in claim 1, wherein:
said control unit is adapted to be connected to sensing means adapted to collect data relating to the driving condition of said vehicle and/or to the behavior of said wheel and in that said control unit can be supplied with the data, said control unit being also adapted to provide said first and second power electronic units with corresponding signals as a function of the data thus controlling the supply of electrical power to said first driving means and said second braking means.

3. An electromechanical module as claimed in claim 1 wherein:
said first power electronic unit is adapted to be electrically connected to a first battery pack so as to control the supply of electrical power from said first battery pack to said first driving means, and in that said second power electronic unit is adapted to be electrically connected to a second battery pack so as to control the supply of electrical power from said second battery pack to said second braking means.

4. An electromechanical module as claimed in claim 1 wherein:
said first driving means are adapted to generate electrical power when not performing said driving function, and in that said module further comprises a third power electronic unit electrically connected to each of said first and second power electronic units so as to allow the electrical power generated by said driving means to be collected from said first driving means, and at least partially supplied to said second braking means.

5. An electromechanical module as claimed in claim 4, wherein said third power electronic unit further comprises:
means for at least partially dissipating the electrical power collected from said first driving means, so that the electrical power transferred to said second braking means is less than the electrical power collected from said first driving means.

6. An electromechanical module as claimed in claim 1, wherein:
said first and second power electronic units comprises a plurality of switching devices electrically connected in parallel and a capacitor bank connected in parallel with said plurality of switching devices.

7. An electromechanical module as claimed in claim 6, wherein:
said pluralities of switching devices comprises a plurality of transistors.

8. An electromechanical module as claimed in claim 7, wherein:
said transistors comprise one or more of bipolar transistors, IGBTs transistors and mosfet transistors.

9. An electromechanical module as claimed in one of claims 6 wherein:
said switching means of each of said first and second power electronic units are separately connected to said control unit through corresponding electrical connections.

10. An electromechanical module as claimed in claim 1, wherein:
said electric motor is adapted to be received inside the hub of said single wheel together with said first mechanical actuating means.

11. An electromechanical module as claimed in claim 1, wherein:
said first mechanical actuating means comprise transmission means adapted to act on a driving axle of said wheel.

12. An electromechanical module as claimed in claim 11, wherein:
said transmission means comprise a transmission belt.

13. An electromechanical module as claimed in claim 11, wherein:
said transmission means comprise a gear box.

14. An electromechanical module as claimed in claim 1, wherein:
said second actuating means comprise an hydraulic pump driven by said second electric motor.

15. An electromechanical module adapted to act on a wheel of a vehicle so as to perform both the driving function and the braking function on said wheel, comprising:
first electromechanical driving means adapted to perform said driving function on said wheel,
second electromechanical braking means adapted to perform said braking function on friction means of said wheel,
means for controlling the supply of electrical power to each of said first driving means and second braking means,
wherein said means for controlling the supply of electrical power to each of said first driving means and second braking means comprise a first power electric unit electrically connected to said first electromechanical driving means, a second power electric unit electrically connected to said second electromechanical braking means, and a control unit electrically connected to each of said first and second power electronic units,
wherein said second electromechanically braking means comprise a second electric motor electrically connected to said second power electronic unit and second actuating means adapted to be activated by said second electric motor so as to perform said braking function on said friction means of said wheel, and
said second actuating means comprise rotatable means adapted to be rotated by said electric motor and a displaceable actuating member adapted to actuate at least one brake lining, thus pressing it against said at least one friction element, and in that said rotatable means comprise a rotatable element with a surface abutting against said actuating member so that rotation of said element in a first rotation sense results in said actuating member being displaced along a first actuating direction, thus actuating said at least one brake lining and pressing it against said at least one friction element.

16. An electromechanical module as claimed in claim 15, wherein:
said motor comprises a rotating shaft and in that said rotatable element is firmly fixed to said shaft.

17. An electromechanical module as claimed in claim 16, wherein:
said rotatable element is a cam element with a cam surface abutting against said actuating member.

18. An electromechanical module as claimed in claim 16, wherein:
said rotatable element is eccentrically fixed to said shaft.

19. An actuating device as claimed in claim 15, wherein:
said actuating member comprises a rotatable element abutting against said surface.

20. An electromechanical module as claimed in claim 15, further comprising:
a support frame, and
fixing means for fixing said motor to said frame.

21. An electromechanical module as claimed in claim 20, wherein:

said fixing means comprise displaceable means adapted to be displaced along a second predefined direction, the displacement of said displaceable means along said second predefined direction resulting in said motor being displaced together with said rotatable means along a third predefined direction substantially perpendicular to said second predefined direction and substantially parallel to said first actuating direction.

22. An electromechanical module as claimed in claim 21, wherein:
said displaceable means comprise a sliding member with a sliding surface adapted to slide on a corresponding sliding surface of said frame, said sliding surfaces lying in a plane disposed at an angle α with respect to said second predefined direction.

23. An electromechanical module as claimed in claim 21 further comprising:
displacing means adapted to displace said displaceable means along said second predefined direction.

24. An electromechanical module as claimed in claim 23, wherein:
said displacing means comprise a resilient member adapted to pull said displaceable means along said second predefined direction.

25. An electromechanical module as claimed in claim 23, wherein:
said displacing means are actuated by said electric motor.

26. An electromechanical module as claimed in claim 25, wherein:
said displacing means comprise a rotatable screw member adapted to be rotated by said motor and a nut or bolt member receiving said screw member and firmly fixed to said displaceable means, so that rotation of said screw member results in said displaceable means being displaced along said second predefined direction.

27. An electromechanical module as claimed in claim 26, wherein:
said rotatable means are adapted to be rotated in a second rotation sense, contrary to said first rotation sense, in that it further comprises stopping means to stop said rotatable means in a predefined home position when they are rotated in said second rotation sense and in that said screw member is rotated in said first sense of rotation when said rotatable means reach said home position, due to the arising reverse torque.

28. An electromechanical module as claimed in claim 27, wherein:
said screw member is firmly fixed to the stator of said electronic motor.

29. An electromechanical module as claimed in claim 27, wherein:
said screw member is fixed to the shaft of said motor through a free wheel comprising an inner ring and an outer ring, with said inner ring being mounted as said shaft and said outer ring being coupled with said screw member.

30. An electromechanical module as claimed in claim 29 wherein:
said shaft comprises a first protruding portion, in that said inner ring comprises a latching member and in that said protruding portion is adapted to cooperate with said latching member so as to select the sense of free rotation of said inner ring with respect to said outer ring.

31. An electromechanical module as claimed in claim 30, wherein:
during rotation of said shaft in said first sense of rotation, said latching member is engaged by said protruding portion, resulting in said inner ring being freely rotated in said first sense of rotation with respect to said outer ring, whilst during rotation of said shaft in said second sense of rotation, said latching member is disengaged from said protruding portion, thus resulting in said inner ring being freely rotatable in said second sense of rotation, with respect to said outer ring.

32. An electromechanical module as claimed in claim 15, wherein:
during rotation of said shaft in said second sense of rotation, said inner ring is rotated in said first sense of rotation as soon as said shaft reaches said home position due to the reverse torque arising, thus rotating said outer ring and the screw member in said first sense of rotation, resulting in said displaceable means being displaced in said second predefined direction.

33. A wheeled vehicle comprising:
at least two wheels,
at least one electromechanical module, comprising,
first electromechanical driving means adapted to perform a driving function on one of said at least two wheels,
second electromechanical braking means adapted to perform a braking function on the one of said at least two wheels, wherein said second electromechanical braking means comprises an electric motor rotating a cam element having a cam surface, the cam surface contacting an actuating member coupled to a friction element attached to one of said at least two wheels, and
means for controlling the supply of electrical power to each of said first electromechanical driving means and second electromechanical braking means, with said at least one electromechanical module acting on a corresponding one of said at least two wheels.

34. A vehicle as claimed in claim 33, wherein:
said wheeled vehicle is a four wheel vehicle comprising two front wheels and two rear wheels, either the front wheels or the rear wheels being driven by a main engine, and in that said vehicle comprises two of said modules, each acting on one of the two wheels not driven by said main engine.

35. A vehicle a claimed in claim 34, wherein:
said main engine is a combustion engine.

36. A vehicle a claimed in one of claims 34, wherein:
said main engine comprises a main electric motor.

37. A vehicle a claimed in claim 33, wherein:
said vehicle is a four wheeled vehicle, and in that said vehicle comprises four of said modules, each acting on one of said four wheels.

38. A vehicle a claimed in claim 33, wherein:
said vehicle is a three wheeled vehicle comprising at least two of said modules, each acting on one of said two wheels.

* * * * *